United States Patent [19]
Bladow et al.

[11] Patent Number: 6,115,040
[45] Date of Patent: Sep. 5, 2000

[54] GRAPHICAL USER INTERFACE FOR WEB ENABLED APPLICATIONS

[75] Inventors: Chad R. Bladow, Monument; Carol Y. Devine, Colorado Springs, both of Colo.; Edward Schwarz, New York; Arieh Shamash, Great Neck, both of N.Y.; Richard W. Shoulberg, Manitou Springs; Jeffrey A. Wood, Colorado Springs, both of Colo.

[73] Assignee: MCI Communications Corporation, Washington, D.C.

[21] Appl. No.: 09/159,515

[22] Filed: Sep. 24, 1998

Related U.S. Application Data

[60] Provisional application No. 60/060,655, Sep. 26, 1997.

[51] Int. Cl.$^7$ .............................. G06F 3/00; G06F 15/16
[52] U.S. Cl. .................... 345/335; 345/329; 345/969; 345/334; 345/356; 709/303; 709/203; 709/217
[58] Field of Search ..................... 345/329, 331, 345/335, 339, 333, 334, 346, 969, 356, 357; 707/501, 513; 709/303, 302, 203, 223, 224, 217, 229, 227

[56] References Cited

U.S. PATENT DOCUMENTS

| | | | |
|---|---|---|---|
| 5,287,270 | 2/1994 | Hardy et al. | 705/34 |
| 5,325,290 | 6/1994 | Cauffman et al. | 705/34 |
| 5,475,836 | 12/1995 | Harris et al. | 703/24 X |
| 5,483,596 | 1/1996 | Rosenow et al. | 713/167 |
| 5,491,779 | 2/1996 | Bezjian | 345/440 |
| 5,530,744 | 6/1996 | Charalambous et al. | 379/265 |
| 5,548,726 | 8/1996 | Pettus | 709/221 |
| 5,621,727 | 4/1997 | Vaudreuil | 370/401 |
| 5,623,601 | 4/1997 | Vu | 713/201 |
| 5,630,066 | 5/1997 | Gosling | 709/217 X |
| 5,649,182 | 7/1997 | Reitz | 707/7 |
| 5,666,481 | 9/1997 | Lewis | 714/4 |
| 5,671,354 | 9/1997 | Ito et al. | 713/201 |
| 5,689,645 | 11/1997 | Schettler et al. | 709/226 |
| 5,692,030 | 11/1997 | Teglovic et al. | 379/14 |
| 5,696,906 | 12/1997 | Peters et al. | 705/34 |
| 5,699,403 | 12/1997 | Ronnen | 379/32 |
| 5,706,502 | 1/1998 | Foley et al. | 707/10 |
| 5,708,780 | 1/1998 | Levergood et al. | 709/229 |
| 5,721,908 | 2/1998 | Lagarde et al. | 707/10 |
| 5,721,913 | 2/1998 | Ackroff et al. | 707/103 |
| 5,727,129 | 3/1998 | Barrett et al. | 706/10 |
| 5,734,709 | 3/1998 | DeWitt et al. | 379/207 |
| 5,734,831 | 3/1998 | Sanders | 709/223 |
| 5,742,762 | 4/1998 | Scholl et al. | 709/200 |
| 5,742,768 | 4/1998 | Gennaro et al. | 709/203 |
| 5,742,905 | 4/1998 | Pepe et al. | 455/461 |
| 5,745,754 | 4/1998 | Lagarde et al. | 707/104 |
| 5,754,830 | 5/1998 | Butts et al. | 709/311 |
| 5,764,756 | 6/1998 | Onweller | 379/242 |

(List continued on next page.)

FOREIGN PATENT DOCUMENTS

WO 97/16911  5/1997  WIPO .

OTHER PUBLICATIONS

*Computer Networks*, Andrew S. Tanenbaum, 1996, pp. 410–412.

"XIIR6.3 (Broadway) Overview", http://www.x.org/broadway.htm, 1997.

"Stac Unveils Windows NT 4.0 and Web Browser Support in New ReachOut 7" http://www.stac.com/news/pressrel/pr_ro7_unveil.html, Feb. 1997.

*Primary Examiner*—Raymond J. Bayerl

[57] ABSTRACT

An integrated system of user interfaces for communicating with remote services. A backplane architecture controls and manages the user interfaces by instantiating, launching, overseeing and closing the user interfaces associated with a plurality of applications residing in a remote server. Each application communicates with one another and with the backplane via messaging interfaces. The backplane provides a single uniform user authentication procedure during logon for the user interfaces and also provides session management for a duration of a user session. Session information is maintained by exchanging a session key or keys for identifying the session with remote servers.

29 Claims, 12 Drawing Sheets

6,115,040

U.S. PATENT DOCUMENTS

| Patent No. | Date | Inventor | Class |
|---|---|---|---|
| 5,768,501 | 6/1998 | Lewis | 714/48 |
| 5,778,178 | 7/1998 | Arunachalam | 709/203 |
| 5,781,550 | 7/1998 | Templin et al. | 370/401 |
| 5,781,632 | 7/1998 | Odom | 705/78 |
| 5,787,160 | 7/1998 | Chaney et al. | 379/220 |
| 5,790,780 | 8/1998 | Brichta et al. | 714/46 |
| 5,790,789 | 8/1998 | Suarez | 709/202 |
| 5,793,762 | 8/1998 | Penners et al. | 370/389 |
| 5,793,964 | 8/1998 | Rogers et al. | 709/202 |
| 5,796,393 | 8/1998 | MacNaughton et al. | 345/329 |
| 5,802,320 | 9/1998 | Baehr et al. | 709/249 |
| 5,805,803 | 9/1998 | Birrell et al. | 713/201 |
| 5,812,654 | 9/1998 | Anderson et al. | 379/207 |
| 5,815,080 | 9/1998 | Taguchi | 340/635 |
| 5,815,665 | 9/1998 | Teper et al. | 709/229 |
| 5,819,225 | 10/1998 | Eastwood et al. | 704/275 |
| 5,819,271 | 10/1998 | Mahoney et al. | 707/9 |
| 5,826,029 | 10/1998 | Gore, Jr. et al. | 709/227 |
| 5,826,269 | 10/1998 | Hussey | 707/10 |
| 5,835,084 | 11/1998 | Bailey et al. | 345/326 |
| 5,844,896 | 12/1998 | Marks et al. | 370/385 |
| 5,845,067 | 12/1998 | Porter et al. | 713/200 |
| 5,845,267 | 12/1998 | Ronen | 705/40 |
| 5,850,517 | 12/1998 | Verkler et al. | 709/202 |
| 5,852,810 | 12/1998 | Sotiroff et al. | 705/27 |
| 5,852,812 | 12/1998 | Reeder | 705/39 |
| 5,974,441 | 10/1999 | Rogers et al. | 707/513 X |
| 5,999,972 | 12/1999 | Gish | 709/219 |
| 6,014,702 | 1/2000 | King et al. | 709/227 |

GRAPHICAL USER INTERFACE FOR WEB ENABLED APPLICATIONS

CROSS-REFERENCE TO RELATED APPLICATIONS

The following patent application claims the benefit of U.S. Provisional Patent Application U.S. Ser. No. 60/060,655, filed Sep. 26, 1997, entitled INTEGRATED CUSTOMER INTERFACE SYSTEM FOR COMMUNICATIONS MANAGEMENT.

BACKGROUND OF THE INVENTION

1. Field of the Invention

The present invention relates in general to computer software, and more particularly to a user interface software in a client-server network architecture.

2. Background Art

A client-server software system having a graphical user interface front-end and one or more back-end legacy systems are generally known in the information systems industries. World Wide Web (Web)-based online systems are also starting to emerge as the use of the Internet proliferates world wide. These Web-based online systems usually employ a Web browser displaying Hypertext Markup Language (HTML) pages as graphical user interface (GUI), and often include Java applets and Common Gateway Interface (CGI) programs for customer interaction. In these systems, however the retrieval from a given Uniform Resource Locator (URL) and display on the customer's screen are often performed on a page by page basis. That is, each page retrieved and displayed is independent of any previous or subsequent pages. Because each page is displayed and run independently of one another, components existing on a page are limited in their ability to communicate with other components existing on other pages. Moreover, there is no backbone architecture for managing and overseeing GUI when screen displays are presented as independent HTML pages. Additionally, the HTML pages and Java applets are usually confined to a Web browser within which they are running. Therefore, it is highly desirable to provide a Web-base GUI system which includes a backbone architecture for managing and enabling communications and interoperability among various processes or components comprising the GUI system, and at the same time provide some independence from the Web browser within which the GUI is running.

In conventional systems, a connection is made with a large legacy system via a dial-up connection from a customer owned personal computer or workstation. This connection frequently, although not always, emulates a terminal addressable by the legacy systems. The dial-up access requires custom software on the customer workstation to provide dial-up services, communication services, emulation and/or translation services and generally some resident custom form of the legacy application to interface with the midrange or mainframe computer running the legacy system.

There are several problems associated with the approach. First, the aforementioned software is very hardware dependent, requiring multiple versions of software compatible with each of a wide range of workstations customers generally have. Therefore, extensive inventory for distribution becomes necessary. If the customer hardware platform changes through an upgrade, the software licensing issues must be renegotiated. Moreover, installing the software generally requires an intensive effort on the customer and the software support team before any reliable and secure sessions are possible.

Secondly, dial-up, modem, and communications software interact with each other in many ways which are not always predictable to a custom application, requiring extensive trouble shooting and problem solving for an enterprise wishing to make the legacy system available to the customer, particularly where various telephone exchanges, dialing standards or signal standards are involved.

Thirdly, although more businesses are turning to the Internet to improve customer service and lower costs by providing Web-based support systems, when an enterprise wishes to make more than one system available to the customer, the custom application for one legacy system is not able to connect to a different legacy system, and the customer must generally logoff and logon to switch from one to the other. The delivery technology used by the two legacy systems may be different, requiring different interface standards, and different machine level languages may be used by the two system, as for example, the 96 character EBCDIC language used by IBM, and 127 ASCII character language used by contemporary personal computers. Therefore, an integrated and unified Web-based system for providing an access to a number of different legacy systems in one session is desired.

Finally, the security and entitlement features of the various legacy systems may be completely different, and vary from system to system and platform to platform. It is therefore, desired to provide connectivity to enterprise legacy systems over the public Internet, as the Internet provides access connectivity world wide via the TCP/IP protocol, without need to navigate various telephone exchanges, dialing standards or signal standards.

The popularity of the public Internet provides a measure of platform independence for the customer, as the customer can run their own Internet Web browser and utilize their own platform connection to the Internet to enable services. This resolves many of the platform hardware and connectivity issues in the customers favor, and leaves the choice of platform and operating system to the customer. Web-based programs can minimize the need for training and support since they utilize existing client software which the user has already installed and already knows how to use. Further, if the customer later changes that platform, then, as soon as the new platform is Internet enabled, service is restored to the customer. The connectivity and communications software burden is thus resolved in favor of standard and readily available hardware and the browser and software used by the public Internet connection.

An Internet delivered paradigm obviates many of the installation and configuration problems involved with initial setup and configuration of a customer workstation, since the custom application required to interface with the legacy system can be delivered via the pubic Internet and run within a standard Web browser, reducing application compatibility issues to browser compatibility issues.

For the enterprise, the use of off-the-shelf Web browsers by the customer significantly simplifies the enterprise burden by limiting the client development side to screen layout designs and data presentation tools that use a common interface enabled by the Web browser. Software development and support resources are thus available for the delivery of the enterprise legacy services and are not consumed by a need for customer support at the workstation level.

SUMMARY OF THE INVENTION

The present invention is directed to an integrated graphical user interface system for enabling a user to interact with one or more application services provided by remote servers. The present invention utilizes the Web paradigm to allow easy and convenient access from the user's perspective. In order to provide cross-platform software that is not dependent on specific hardware or operating system, the present invention is implemented using programming languages, such as Java™ which only requires a Java™ enabled Web browser.

The system of the present invention includes an application backplane unit for controlling and managing the overall user interface system to a number of Web enabled application services. By invoking the backplane unit a user may receive a number of disparate services available from the remote servers.

Each remote service includes its own user interface unit, referred heretofore as a client application, independently implemented of one another and the backplane. Although the client applications are independently developed as separate modules, the system of the present invention provides a capability of integrating the client applications into one unified system, allowing users to access the individual client applications via the backplane unit.

As a novel feature, the present invention provides interoperability between each of the client applications and the backplane, as well as among each of the client applications. Accordingly, it is the object of the present invention to provide an integrated customer interface system to a number of disparate services available from remote servers, wherein separate client applications may communicate with one another and with the backplane unit.

The present invention includes a centralized user authentication feature to insure that the user has valid access to the system. The authentication procedure generally includes a logon object which prompts for and accepts the user's name and password. The logon object then communicates the logon transaction to a remote server responsible for screening those users attempting to access remote services. Once a user has been authenticated by the system of the present invention, the user need not be validated again each time the user accesses another remote server via the respective server's user interface program. In addition, each application may supplement the provided authentication procedure, with its own method of authentication by communicating with its respective servers independently. Accordingly, it is another object of this invention to provide a unified authentication process for all remote services to insure that only those users with valid access code may access the remote services.

Once a validated user is logged onto the system, the user is presented with a set of remote services which the user may obtain. The set of remote services available for each user is unique and depends on each user's subscriptions to the services. The set of service subscription, then forms the user's entitlements for the services. Thus, for example, if a user subscribes to a toll free network service, the user is entitled to access information regarding the service. On the other hand, if the user does not subscribe to the toll free network service, that option is not available for the user to select.

The present invention includes a user object to represent a current user logged onto the system. This user object, inter alia, is responsible for obtaining from a remote server the current user's information including the user's entitlements to various remote services. The backplane uses the entitlement information to provide only those services available to the user. As explained previously, the backplane would deactivate the services to which the user did not have the entitlements, effectually blocking the user from accessing those services.

In addition, the user information is maintained for the duration of a logon session, allowing both the backplane and the client applications to access the information as needed throughout the duration of the session. The backplane and the client applications use the information to selectively provide remote services to users. Accordingly, it is yet another object of the present invention to provide a mechanism for retrieving and maintaining user information and entitlements such that they are available to processes and threads running on the client platform without having to communicate with a remote server every time the information is needed.

The system of the present invention presents the remote services for the user to select in a form of an application toolbar on a screen. The toolbar runs in an independent frame and allows the users to access different remote services from any screen during the life of a session.

The system of the present invention implements a "keep alive message" passed between a client and a server, also called a "heartbeat". For example, a keep alive message is sent every predefined period, e.g., 1 minute from a client application to the server. When the client application fails to heartbeat consecutively for a predetermined period of time, for example, one hour, the server treats this client application as having exited by closing the application and performing cleanup routines associated with the application. This mechanism effectively prevents unwanted sessions from remaining open in the event of client application failures. Accordingly, it is further object of the present invention to provide a mechanism for detecting communication failures among the "stateless" processes running the present invention.

The present invention also includes object oriented base classes and interfaces for the backplane and the client applications to use. The client applications typically extend and implement them in order to achieve tight integration with the backplane unit. By use of the base classes and interfaces, the client applications may be implemented in more than one way.

For example, the client application may be derived directly from the java object class, or alternatively, from the java applet class. Depending on the implementation mechanism, the backplane may launch the client applications either directly or by retrieving another Web page which launches the client application. Accordingly, it is further object of the present invention to provide a flexible and modular approach to implementing each of the client applications as need arises, and yet at the same time provide tightly controlled runtime environment for the disparate client applications.

BRIEF DESCRIPTION OF THE DRAWINGS

Preferred embodiments of the present invention will now be described, by way of example only, with reference to the accompanying drawings in which.

DESCRIPTION OF THE PREFERRED EMBODIMENT

An Overview of the Web-Enabled Integrated System

The present invention is one component of an integrated suite of customer network management and report applications using a Web browser paradigm. Known as the networkMCI Interact system ("nMCI Interact") such an integrated suite of Web-based applications provides an invaluable tool for enabling customers to manage their telecommunication assets, quickly and securely, from anywhere in the world.

As described in co-pending U.S. patent application No. 09/159,695, filed Sep. 24, 1998 the nMCI Interact system architecture is basically organized as a set of common components comprising the following:

1) an object-oriented software architecture detailing the client and server based aspect of nMCI Interact;

2) a network architecture defining the physical network needed to satisfy the security and data volume requirements of the networkMCI System;

3) a data architecture detailing the application, back-end or legacy data sources available for networkMCI Interact; and 4) an infrastructure covering security, order entry, fulfillment, billing, self-monitoring, metrics and support.

Each of these common component areas will be generally discussed hereinbelow. A detailed description of each of these components can be found in a related, co-pending U.S. patent application U.S. Ser. No. 09/159,695, filed Sep. 24, 1998 entitled INTEGRATED CUSTOMER INTERFACE SYSTEM FOR COMMUNICATIONS NETWORK MANAGEMENT, the disclosure of which is incorporated herein by reference thereto.

Figure 1:
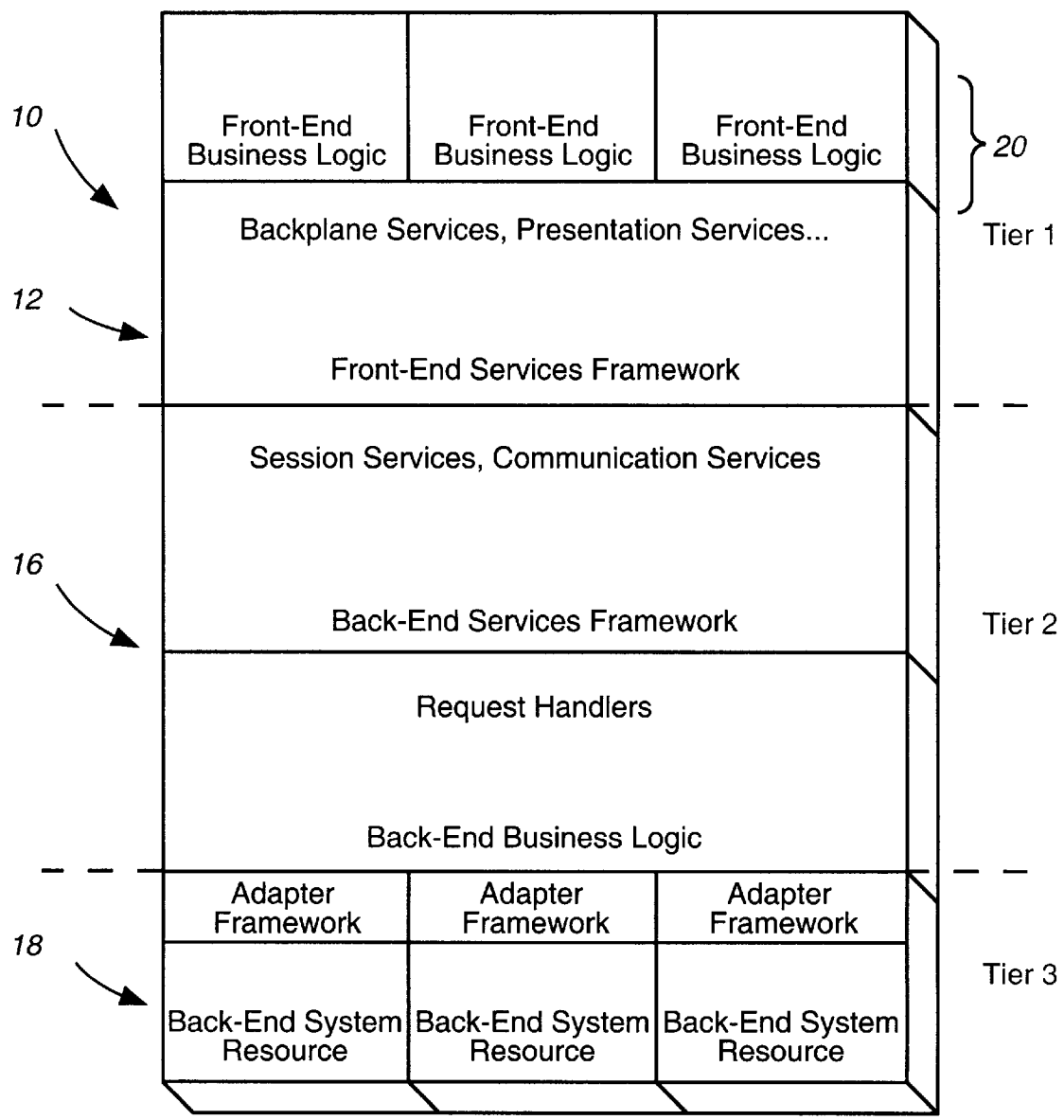
FIG. 1 illustrates the software architecture component comprising a three-tiered structure.

FIG. 1 is a diagrammatic illustration of the software architecture component in which the present invention functions. A first or client tier 10 of software services are resident on a customer workstation 10 and provides customer access to the enterprise system, having one or more downloadable application objects directed to front-end business logic, one or more backplane service objects for managing sessions, one or more presentation services objects for the presentation of customer options and customer requested data in a browser recognizable format and a customer supplied browser for presentation of customer options and data to the customer and for Internet communications over the public Internet. Additional applications are directed to front-end services such as the presentation of data in the form of tables and charts, and data processing functions such as sorting and summarizing in a manner such that multiple programs are combined in a unified application suite.

A second or middle tier 16, is provided having secure web servers and back-end services to provide applications that establish user sessions, govern user authentication and their entitlements, and communicate with adaptor programs to simplify the interchange of data across the network.

A third or back-end tier 18 having applications directed to legacy back-end services including database storage and retrieval systems and one or more database servers for accessing system resources from one or more legacy hosts.

Generally, as will be explained below, the customer workstation includes client software capable of providing a platform-independent, browser-based, consistent user interface implementing objects programmed to provide a reusable and common GUI abstraction and problem-domain abstractions. More specifically, the client-tier software is created and distributed as a set of Java classes including the applet classes to provide an industrial strength, object-oriented environment over the Internet. Application-specific classes are designed to support the functionality and server interfaces for each application with the functionality delivered through the system being of two-types: 1) cross-product, for example, inbox and reporting functions, and 2) product specific, for example, toll free network management or call management functions. The system is capable of delivering to customers the functionality appropriate to their product mix.

Figure 2:
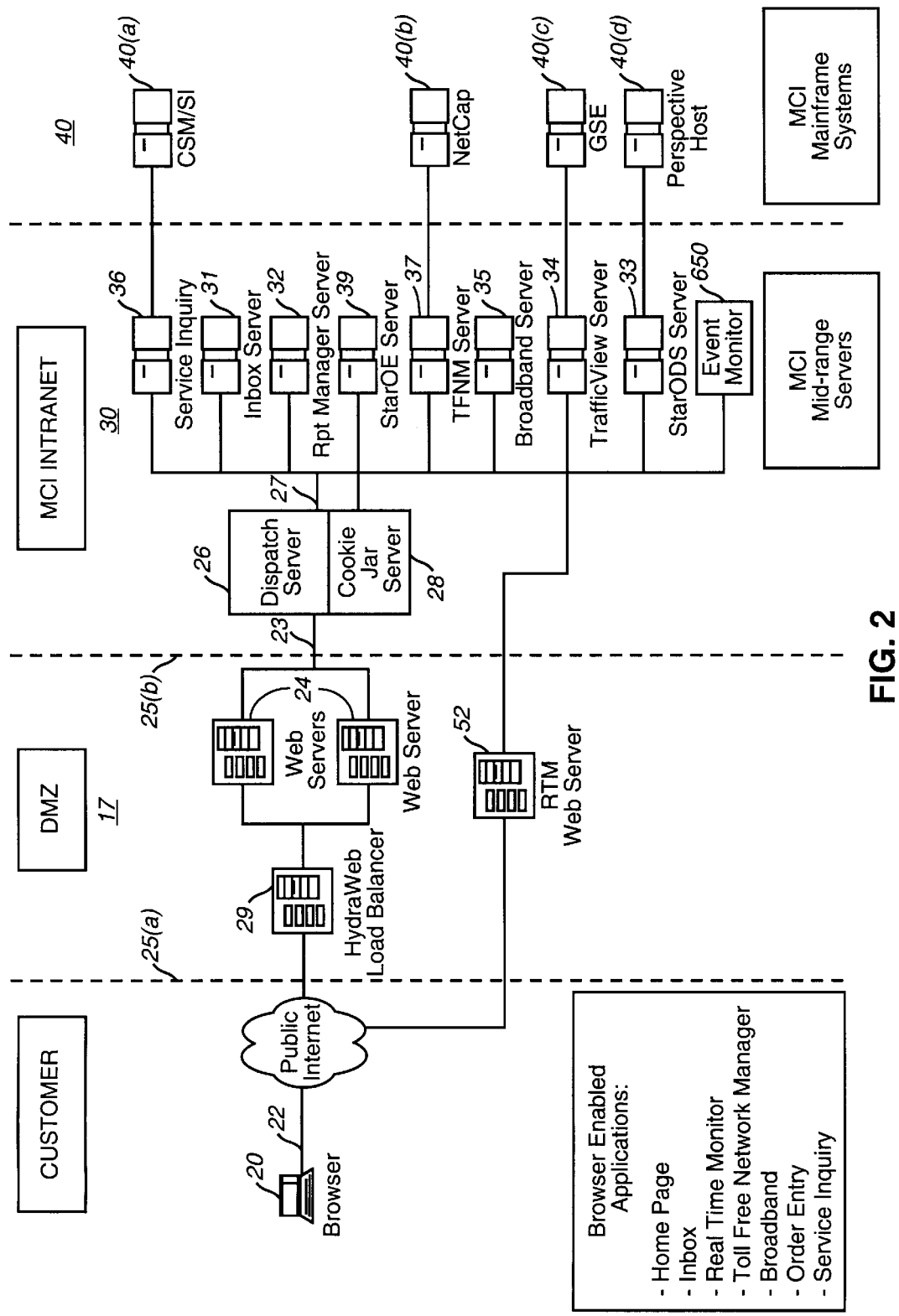
FIG. 2 is a diagrammatic overview of the software architecture of the networkMCI Interact system.

FIG. 2 is a diagrammatic overview of the software architecture of the networkMCI Interact system including: the Customer Browser (a.k.a. the Client) 20; the Demilitarized Zone (DMZ) 17 comprising a Web Servers cluster 24; the MCI Intranet Dispatcher Server 26; and the MCI Intranet Application servers 30, and the data warehouses, legacy systems, etc. 40.

Figure 3:
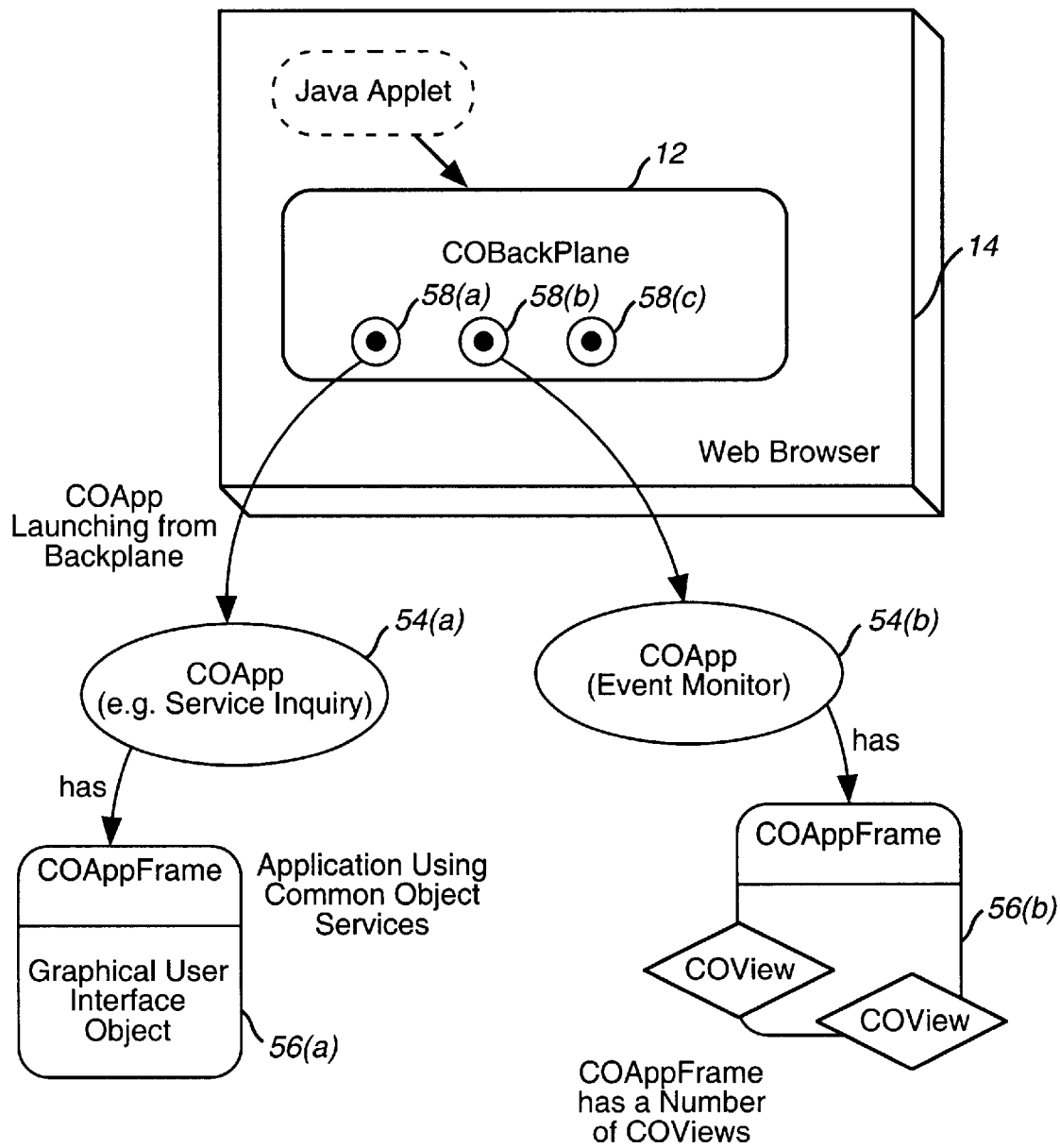
FIG. 3 is an illustrative example of a backplane architecture schematic as invoked from a home page of the present system.

The Customer Browser 20, is browser enabled and includes client applications responsible for presentation and front-end services. Its functions include providing a user interface to various MCI services and supporting communications with MCI's Intranet web server cluster 24. As illustrated in FIG. 3, and more specifically described below, the client tier software is responsible for presentation services to the customer and generally includes a web browser 14 and additional object-oriented programs residing in the client workstation platform 20. The client software is generally organized into a component architecture with each component generally comprising a specific application, providing an area of functionality. The applications generally are integrated using a "backplane" services layer 12 which provides a set of services to the application objects that provide the front-end business logic. The backplane services layer 12 also manages the launching of the application objects. The networkMCI Interact common set of objects provide a set of services to each of the applications. The set of services include: 1) session management; 2) application launch; 3) inter-application communications; 4) window navigation among applications; 5) log management; and 6) version management.

The primary common object services include: graphical user interface (GUI); communications; printing; user identity, authentication, and entitlements; data import and export; logging and statistics; error handling; and messaging services.

FIG. 3 is a diagrammatic example of a backplane architecture scheme illustrating the relationship among the common objects. In this example, the backplane services layer 12 is programmed as a Java applet which may be loaded and launched by the web browser 14. With reference to FIG. 3, a typical user session starts with a web browser 14 creating a backplane 12, after a successful logon. The backplane 12, inter alia, presents a user with an interface for networkMCI Interact application management. A typical user display provided by the backplane 12 may show a number of applications the user is entitled to run, each application represented by buttons depicted in FIG. 3 as buttons 58a,b,c selectable by the user. As illustrated in FIG. 3, upon selection of an application, the backplane 12 launches that specific application, for example, Service Inquiry 54a or Event Monitor 54b, by creating the application object. In processing its functions, each application in turn, may utilize common object services provided by the backplane 12. FIG. 3 shows graphical user interface objects 56a,b created and used by a respective application 54a,b for its own presentation purposes.

Figure 4:
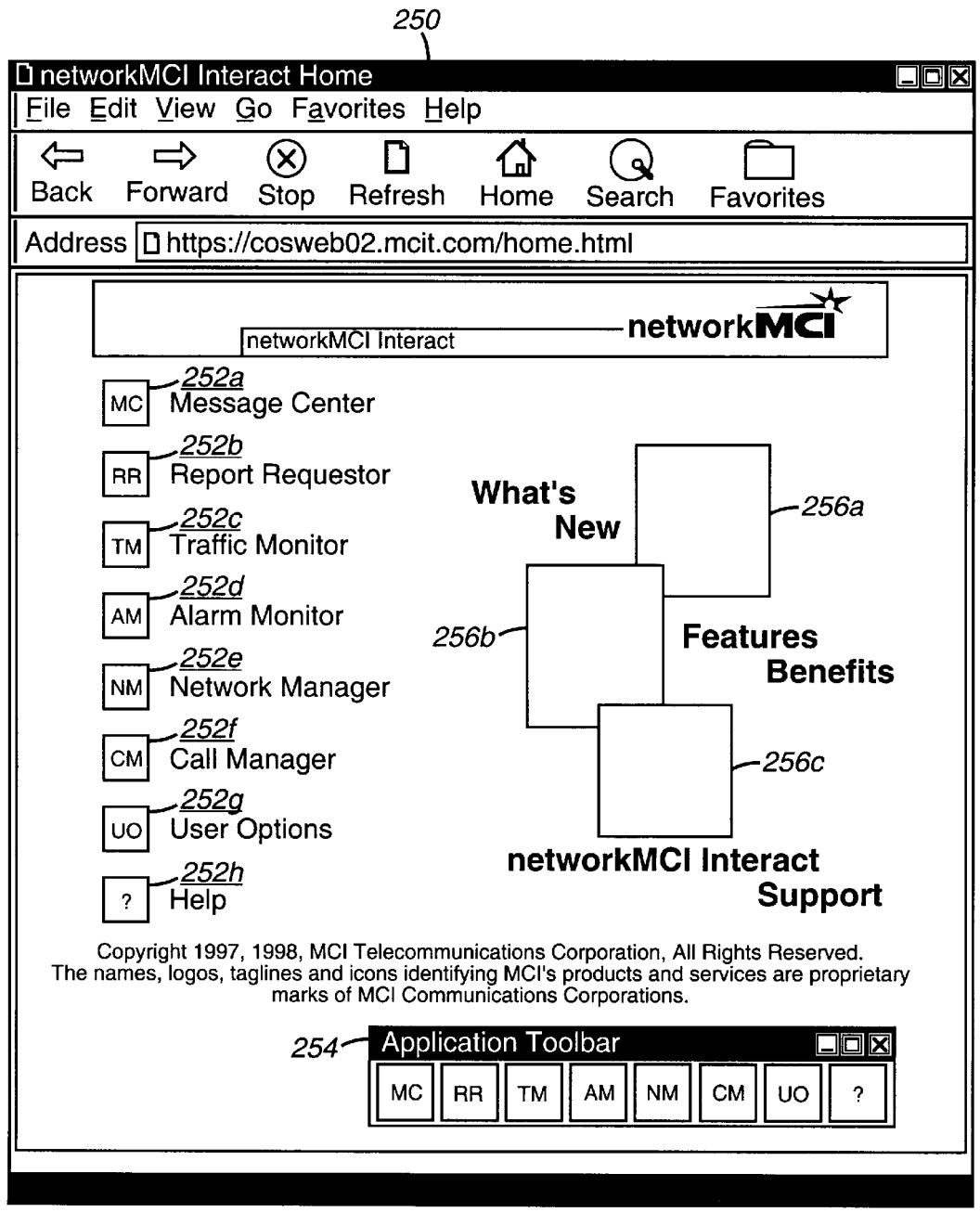
FIG. 4 illustrates an example client GUI presented to the client/customer as a browser Web page.

FIG. 4 illustrates an example client GUI presented to the client/customer as a browser web page 250 providing, for example, a suite 252 of network management reporting applications including: MCI Traffic Monitor 252c; Call Manager 252f; and Network Manager 252e. Access to network functionality is also provided through Report Requester 252b, which provides a variety of detailed reports for the client/customer and a Message Center 252a for providing enhancements and functionality to traditional e-mail communications.

As shown in FIG. 2, the client browser objects communicates the data by establishing a secure TCP messaging session with one of the DMZ networkMCI Interact Web servers 24 via an Internet secure communications path 22 established, preferably, with a secure sockets SSL version of HTTPS. The DMZ networkMCI Interact Web servers 24 function to decrypt the client message, preferably via the SSL implementation, and unwrap the session key and verify the users session. After establishing that the request has come from a valid user and mapping the request to its associated session, the DMZ Web servers 24 re-encrypt the request using symmetric encryption and forward it over a second socket connection 23 to the dispatch server 26 inside the enterprise Intranet.

As described in greater detail in co-pending U.S. patent application Ser. No. 09/159,514, filed Sep. 24, 1998 entitled SECURE CUSTOMER INTERFACE FOR WEB-BASED DATA MANAGEMENT, the contents and disclosure of which are incorporated by reference as if fully set forth herein, a networkMCI Interact session is designated by a logon, successful authentication, followed by use of server resources, and logoff. However, the world-wide web communications protocol uses HTTP, a stateless protocol, each HTTP request and reply is a separate TCP/IP connection, completely independent of all previous or future connections between the same server and client. The nMCI Interact system is implemented with a secure version of HTTP such as S-HTTP or HTTPS, and preferably utilizes the SSL implementation of HTTPS. The preferred embodiment uses SSL which provides a cipher spec message which provides server authentication during a session. The preferred embodiment further associates a given HTTPS request with a logical session which is initiated and tracked by a "cookie jar server" 28 to generate a "cookie" which is a unique server-generated key that is sent to the client along with each reply to a HTTPS request. The client holds the cookie and returns it to the server as part of each subsequent HTTPS request. As desired, either the Web servers 24, the cookie jar server 28 or the Dispatch Server 26, may maintain the "cookie jar" to map these keys to the associated session. A separate cookie jar server 28, as illustrated in FIG. 2 has been found desirable to minimize the load on the dispatch server 26. This form of session management also functions as an authentication of each HTTPS request, adding an additional level of security to the overall process.

As illustrated in FIG. 2, after one of the DMZ Web servers 24 decrypts and verifies the user session, it forwards the message through a firewall 25b over a TCP/IP connection 23 to the dispatch server 26 on a new TCP socket while the original socket 22 from the browser is blocking, waiting for a response. The dispatch server 26 unwraps an outer protocol layer of the message from the DMZ services cluster 24, and re-encrypts the message with symmetric encryption and forwards the message to an appropriate application proxy via a third TCP/IP socket 27. While waiting for the proxy response all three of the sockets 22, 23, 27 block on a receive. Specifically, once the message is decrypted, the wrappers are examined to reveal the user and the target middle-tier (Intranet application) service for the request. A first-level validation is performed, making sure that the user is entitled to communicate with the desired service. The user's entitlements in this regard are fetched by the dispatch server 26 from the StarOE server 49, the server component of the present invention, at logon time and cached.

If the requester is authorized to communicate with the target service, the message is forwarded to the desired service's proxy. Each application proxy is an application specific daemon which resides on a specific Intranet server, shown in FIG. 2 as a suite of midrange servers 30. Each Intranet application server of suite 30 is generally responsible for providing a specific back-end service requested by the client, and, is additionally capable of requesting services from other Intranet application servers by communicating to the specific proxy associated with that other application server. Thus, an application server not only can offer its browser a client to server interface through the proxy, but also may offer all its services from its proxy to other application servers. In effect, the application servers requesting services are acting as clients to the application servers providing the services. Such mechanism increases the security of the overall system as well as reducing the number of interfaces.

The network architecture of FIG. 2 may also include a variety of application specific proxies having associated Intranet application servers including: a StarOE proxy for the StarOE application server 39 for handling authentication order entry/billing; an Inbox proxy for the Inbox application server 31, which functions as a container for completed reports, call detail data and marketing news messages; a Report Manager proxy capable of communicating with a system-specific Report Manager server 32 for generation, management and receipt notification of customized reports; a Report Scheduler proxy for performing the scheduling and requests of the customized reports. The customized reports include, for example: call usage analysis information provided from the StarODS server 33; network traffic analysis/monitor information provided from the Traffic view server 34; virtual data network alarms and performance reports provided by Broadband server 35; trouble tickets for switching, transmission and traffic faults provided by Service Inquiry server 36; and toll free routing information provided by Toll Free Network Manager server 37.

As partially shown in FIG. 2, it is understood that each Intranet server of suite 30 communicates with one or several consolidated network databases which include each customer's network management information and data. For example, the Services Inquiry server 36 includes communication with MCI's Customer Service Management legacy platform 40(a). Such network management and customer network data is additionally accessible by authorized MCI management personnel. As shown in FIG. 2, other legacy platforms 40(b), 40(c) and 40(d) may also communicate individually with the Intranet servers for servicing specific transactions initiated at the client browser. The illustrated legacy platforms 40(a)–(d) are illustrative only and it is understood other legacy platforms may be interpreted into the network architecture illustrated in FIG. 2 through an intermediate midrange server 30.

Each of the individual proxies may be maintained on the dispatch server 26, the related application server, or a separate proxy server situated between the dispatch server 26 and the midrange server 30. The relevant proxy waits for requests from an application client running on the customer's workstation 10 and then services the request, either by handling them internally or forwarding them to its associated Intranet application server 30. The proxies additionally receive appropriate responses back from an Intranet application server 30. Any data returned from the Intranet application server 30 is translated back to client format, and returned over the Internet to the client workstation 10 via the Dispatch Server 26 and at one of the web servers in the DMZ Services cluster 24 and a secure sockets connection. When the resultant response header and trailing application specific data are sent back to the client browser from the proxy, the messages will cascade all the way back to the browser 14 in real time, limited only by the transmission latency speed of the network.

The networkMCI Interact middle tier software includes a communications component offering three (3) types of data transport mechanisms: 1) Synchronous; 2) Asynchronous; and 3) Bulk transfer. Synchronous transaction is used for situations in which data will be returned by the application server 40 quickly. Thus, a single TCP connection will be made and kept open until the full response has been retrieved.

Asynchronous transaction is supported generally for situations in which there may be a long delay in application server 40 response. Specifically, a proxy will accept a request from a customer or client 10 via an SSL connection and then respond to the client 10 with a unique identifier and close the socket connection. The client 10 may then poll repeatedly on a periodic basis until the response is ready. Each poll will occur on a new socket connection to the proxy, and the proxy will either respond with the resultant data or, respond that the request is still in progress. This will reduce the number of resource consuming TCP connections open at any time and permit a user to close their browser or disconnect a modem and return later to check for results.

Bulk transfer is generally intended for large data transfers and are unlimited in size. Bulk transfer permits cancellation during a transfer and allows the programmer to code resumption of a transfer at a later point in time.

Figure 5:
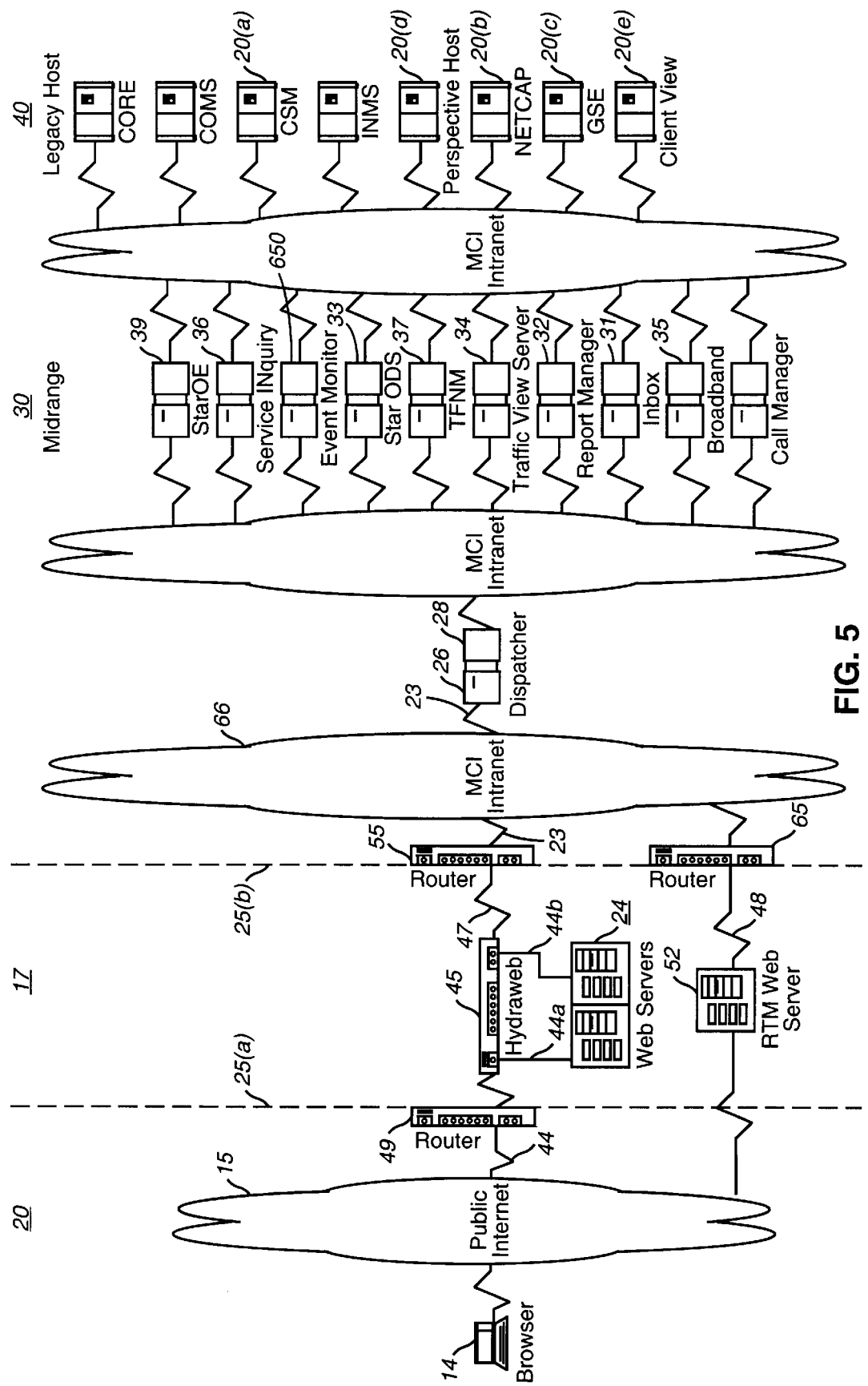
FIG. 5 is a diagram depicting the physical network architecture in the system of the present invention.

FIG. 5 is a diagram depicting the physical networkMCI Interact system architecture 10. As shown in FIG. 5, the system is divided into three major architectural divisions including: 1) the customer workstation 20 which include those mechanisms enabling customer connection to the Secure web servers 24; 2) a secure network area 17, known as the DeMilitarized Zone "DMZ" set aside on MCI premises double firewalled between the both the public Internet 25 and the MCI Intranet to prevent potentially hostile customer attacks; and, 3) the MCI Intranet Midrange Servers 30 and Legacy Mainframe Systems 40 which comprise the back-end business logic applications.

As illustrated in FIG. 5, the present invention includes a double or complex firewall system that creates a "demilitarized zone" (DMZ) between two firewalls 25a, 25b. In the preferred embodiment, one of the firewalls 25a includes port specific filtering routers, which may only connect with a designated port on a dispatch server within the DMZ. The dispatch server connects with an authentication server, and through a proxy firewall to the application servers. This ensures that even if a remote user ID and password are hijacked, the only access granted is to one of the web servers 24 or to intermediate data and privileges authorized for that user. Further, the hijacker may not directly connect to any enterprise server in the enterprise intranet, thus ensuring internal company system security and integrity. Even with a stolen password, the hijacker may not connect to other ports, root directories or applications within the enterprise system.

The DMZ acts as a double firewall for the enterprise intranet because the web servers located in the DMZ never store or compute actual customer sensitive data. The web servers only put the data into a form suitable for display by the customer's web browser. Since the DMZ web servers do not store customer data, there is a much smaller chance of any customer information being jeopardized in case of a security breach.

As previously described, the customer access mechanism is a client workstation 20 employing a Web browser 14 for providing the access to the networkMCI Interact system via the public Internet 15. When a subscriber connects to the networkMCI Interact Web site by entering the appropriate URL, a secure TCP/IP communications link 22 is established to one of several Web servers 24 located inside a first firewall 25a in the DMZ 17. Preferably at least two web servers are provided for redundancy and failover capability. In the preferred embodiment of the invention, the system employs SSL encryption so that communications in both directions between the subscriber and the networkMCI Interact system are secure.

In the preferred embodiment, all DMZ Secure Web servers 24 are preferably DEC 4100 systems having Unix or NT-based operating systems for running services such as HTTPS, FTP, and Telnet over TCP/IP. The web servers may be interconnected by a fast Ethernet LAN running at 100 Mbit/sec or greater, preferably with the deployment of switches within the Ethernet LANs for improved bandwidth utilization. One such switching unit included as part of the network architecture is a HydraWEB™ unit 45, manufactured by HydraWEB Technologies, Inc., which provides the DMZ with a virtual IP address so that subscriber HTTPS requests received over the Internet will always be received. The HydraWEB™ unit 45 implements a load balancing algorithm enabling intelligent packet routing and providing optimal reliability and performance by guaranteeing accessibility to the "most available" server. It particularly monitors all aspects of web server health from CPU usage, to memory utilization, to available swap space so that Internet/Intranet networks can increase their hit rate and reduce Web server management costs. In this manner, resource utilization is maximized and bandwidth (throughput) is improved. It should be understood that a redundant HydraWEB™ unit may be implemented in a Hot/Standby configuration with heartbeat messaging between the two units (not shown). Moreover, the networkMCI Interact system architecture affords web server scaling, both in vertical and horizontal directions. Additionally, the architecture is such that new secure web servers 24 may be easily added as customer requirements and usage increases. The use of the HydraWEB™ enables better load distribution when needed to match performance requirements.

As shown in FIG. 5, the most available Web server 24 receives subscriber HTTPS requests, for example, from the HydraWEB™ 45 over a connection 44a and generates the appropriate encrypted messages for routing the request to the appropriate MCI Intranet midrange web server over connection 44b, router 55 and connection 23. Via the HydraWEB™ unit 45, a TCP/IP connection 38 links the Secure Web server 24 with the MCI Intranet Dispatcher server 26.

Further as shown in the DMZ 17 is a second RTM server 52 having its own connection to the public Internet via a TCP/IP connection 48. As described in co-pending U.S. patent application Ser. No. 09/159,516, filed Sep. 24, 1998 entitled INTEGRATED PROXY INTERFACE FOR WEB BASED TELECOMMUNICATIONS MANAGEMENT TOOLS, incorporated by reference as if fully set forth herein, this RTM server provides real-time session management for subscribers of the networkMCI Interact Real Time Monitoring system. An additional TCP/IP connection 48 links the RTM Web server 52 with the MCI Intranet Dispatcher server 26.

With more particularity, as further shown in FIG. 5, the networkMCI Interact physical architecture includes three routers: a first router 49 for routing encrypted messages from the Public Internet 15 to the HydraWEB™ 45 over a socket connection 44; a second router 55 for routing encrypted subscriber messages from a Secure Web server 24 to the Dispatcher server 26 located inside the second firewall 25b; and, a third router 65 for routing encrypted subscriber messages from the RTM Web server 52 to the Dispatcher server 26 inside the second firewall. Although not shown, each of the routers 55, 65 may additionally route signals through a series of other routers before eventually being routed to the nMCI Interact Dispatcher server 26. In operation, each of the Secure servers 24 function to decrypt the client message, preferably via the SSL implementation, and unwrap the session key and verify the users session from the COUser object authenticated at Logon.

After establishing that the request has come from a valid user and mapping the request to its associated session, the Secure Web servers 24 will re-encrypt the request using symmetric RSA encryption and forward it over a second secure socket connection 23 to the dispatch server 26 inside the enterprise Intranet.

As described herein, and in greater detail in co-pending U.S. patent application Ser. No. 09/159,695, filed Sep. 24, 1998 the data architecture component of networkMCI Interact reporting system is focused on the presentation of real time (un-priced) call detail data, such as provided by MCI's TrafficView Server 34, and priced call detail data and reports, such as provided by MCI's StarODS Server 33 in a variety of user selected formats.

All reporting is provided through a Report Requestor GUI application interface which support spreadsheet, a variety of graph and chart type, or both simultaneously. For example, the spreadsheet presentation allows for sorting by any arbitrary set of columns. The report viewer may also be launched from the inbox when a report is selected.

A common database may be maintained to hold the common configuration data which may be used by the GUI applications and by the mid-range servers. Such common data includes but are not limited to: customer security profiles, billing hierarchies for each customer, general reference data (states, NPA's, Country codes), and customer specific pick lists: e.g., ANI's, calling cards, etc. An MCI Internet StarOE server manages the data base for the common configuration of data.

Report management related data is also generated which includes 1) report profiles defining the types of reports that are available, fields for the reports, default sort options and customizations allowed; and 2) report requests defining customer specific report requests including report type, report name, scheduling criteria, and subtotal fields. This type of data is typically resident in a Report Manager server database and managed by the Report Manager.

The Infrastructure component of the nMCI Reporting system includes mechanisms for providing secure communications regardless of the data content being communicated. As described in detail in above-referenced, co-pending U.S. patent application Ser. No. 09/159,514, filed Sep. 24, 1998 the nMCI Interact system security infrastructure includes: 1) authentication, including the use of passwords and digital certificates; 2) public key encryption, such as employed by a secure sockets layer (SSL) encryption protocol; 3) firewalls, such as described above with reference to the network architecture component; and 4) non-repudiation techniques to guarantee that a message originating from a source is the actual identified sender. One technique employed to combat repudiation includes use of an audit trail with electronically signed one-way message digests included with each transaction.

Another component of the nMCI Interact infrastructure includes order entry, which is supported by the present invention, the Order Entry ("StarOE") service. The general categories of features to be ordered include: 1) Priced Reporting; 2) Real-time reporting; 3) Priced Call Detail; 4) Real Time Call Detail; 5) Broadband SNMP Alarming; 6) Broadband Reports; 7) Inbound RTM; 8) Outbound RTM; 9) Toll Free Network Manager; and 10) Call Manager. The order entry functionality is extended to additionally support 11) Event Monitor; 12) Service Inquiry; 13) Outbound Network Manager; and, 14) Online invoicing.

The self-monitoring infrastructure component for nMCI Interact is the employment of mid-range servers that support SNMP alerts at the hardware level. In addition, all software processes must generate alerts based on process health, connectivity, and availability of resources (e.g., disk usage, CPU utilization, database availability).

The Metrics infrastructure component for nMCI Interact is the employment of mechanisms to monitor throughput and volumes at the Web servers, dispatcher server, application proxies and mid-range servers. Metrics monitoring helps in the determination of hardware and network growth.

To provide the areas of functionality described above, the client tier 10 is organized into a component architecture, with each component providing one of the areas of functionality. As explained in further detail in co-pending U.S. patent application Ser. No. 09/159,155, filed Sep. 24, 1998, the client-tier software is organized into a "component" architecture supporting such applications as inbox fetch and inbox management, report viewer and report requester, TFNM, Event Monitor, Broadband, RealTime Monitor, and system administration applications.

Further functionality integrated into the software architecture includes applications such as Outbound Network Manager, Call Manager, Service Inquiry and Online invoicing.

Client Browser Application

The present invention is directed to the client tier software component of the overall system described above. The system of the present invention provides an integrated and unified interface to a number of Web enabled application services, i.e., the fulfilling systems, available to a user. As shown in FIG. 3, the system of the present invention implements an "application backplane" 12, a single object which keeps track of all the client applications, and which has capabilities to start, stop, and provide references to any one of the client applications. The application backplane 12 is typically implemented as a Java applet and is launched when a Web page is retrieved via URL pointing to the enterprise's Web site. The client applications typically comprise of graphical user interface programs which enable a user to interact with one or more Web enabled remote services.

The backplane 52 and the client applications use a browser 14 such as the Microsoft Explorer versions 4.0.1 or higher for an access and distribution mechanism. Although the backplane is initiated with a browser 14, the client applications are generally isolated from the browser in that they typically present their user interfaces in a separate frame, rather than sitting inside a Web page.

The backplane architecture is implemented with several primary classes. These classes include COBackPlane, COApp, COAppImpl, COParm. and COAppFrame classes. COBackPlane 12 is an application backplane which launches the applications 54a, 54b, typically implemented as COApp. COBackPlane 52 is generally implemented as a Java applet and is launched by the Web browser 14. This backplane applet is responsible for launching and closing the COApps.

When the backplane is implemented as an applet, it overrides standard Applet methods init( ), start( ), stop( ) and run( ). In the init( ) method, the backplane applet obtains a COUser user context object. The COUser object holds information such as user profile, applications and their entitlements. The user's configuration and application entitlements provided in the COUser context are used to construct the application toolbar and Inbox applications. When an application toolbar icon is clicked, a particular COApp is launched by launchApp( ) method. The launched application then may use the backplane for inter-application communications, including retrieving Inbox data.

The CoBackPlane 12 includes methods for providing a reference to a particular COApp, for interoperation. For example, the COBackPlane class provides a getApp( ) method which returns references to application objects by name. Once retrieved in this manner, the application object's public interface may be used directly.

COApp is the base interface for the applications. The applications, e.g., TFNM 54a or Call Manager 54b, generally have their startup code and inter-application interface in a class which implements COApp. More information on the implementation of specific client applications are found in the co-pending U.S. patent application Ser. No. 09/159,695, filed Sep. 24, 1998. Generally, two classes are available for the applications, COAppImpl or COApplet. Alternatively, they may provide their own implementation of the interface. In the preferred embodiment, applications typically extend COAppImpl.

COAppImpl is an "applet-like" class, but it does not derive from java.applet.Applet nor from java.awt.Panel. By not deriving from Applet, the applications may be launched at any time without browser having to be pointed to specific page, and frees the applications from running within the browser frame. Classes derived from COAppImpl are created, launched, stopped, and destroyed by the COBackPlane 12. This provides a tight and controlled integration by the system of the present invention.

The COApplet class, on the other hand, extends the Applet class and is intended to be launched by the browser from an HTML <Applet> tag. Extension from Applet is provided for applications needing more isolation from the present integrated system, or requiring a separate browser-based display space. The COApplet class implements most of the COApp interface by forwarding it to a contained COAppImpl object.

COAppFrame 56a, 56b is a desktop window created and used by a COApp to contain its user interface. The COAppFrame 56a. 56b is a separate window from the Web browser 14. Generally, the COAppFrame 56a, 56b has a menu, toolbar, and status bar. The COAppFrame's attachToViewArea( ) method may be used to paste a COView object 60a, 60b, 60c into a COAppFrame 56a, 56b. The COView class is an extension of java.awt.Panel. It provides a general purpose display space and container for an application's visual representation. Application classes typically extend the COView class to implement their presentation logic. COApp may use none, one, or many COAppFrames 56a, 56b.

COParm is a generic data class used to pass parameters between applications. COApp interface provides a public method for passing COParm message objects, for example, public void processMessage (COParm message), which may be used to pass messages between applications. The COParm class contains a set of name value pairs which are used to present information or requests.

Figure 6:
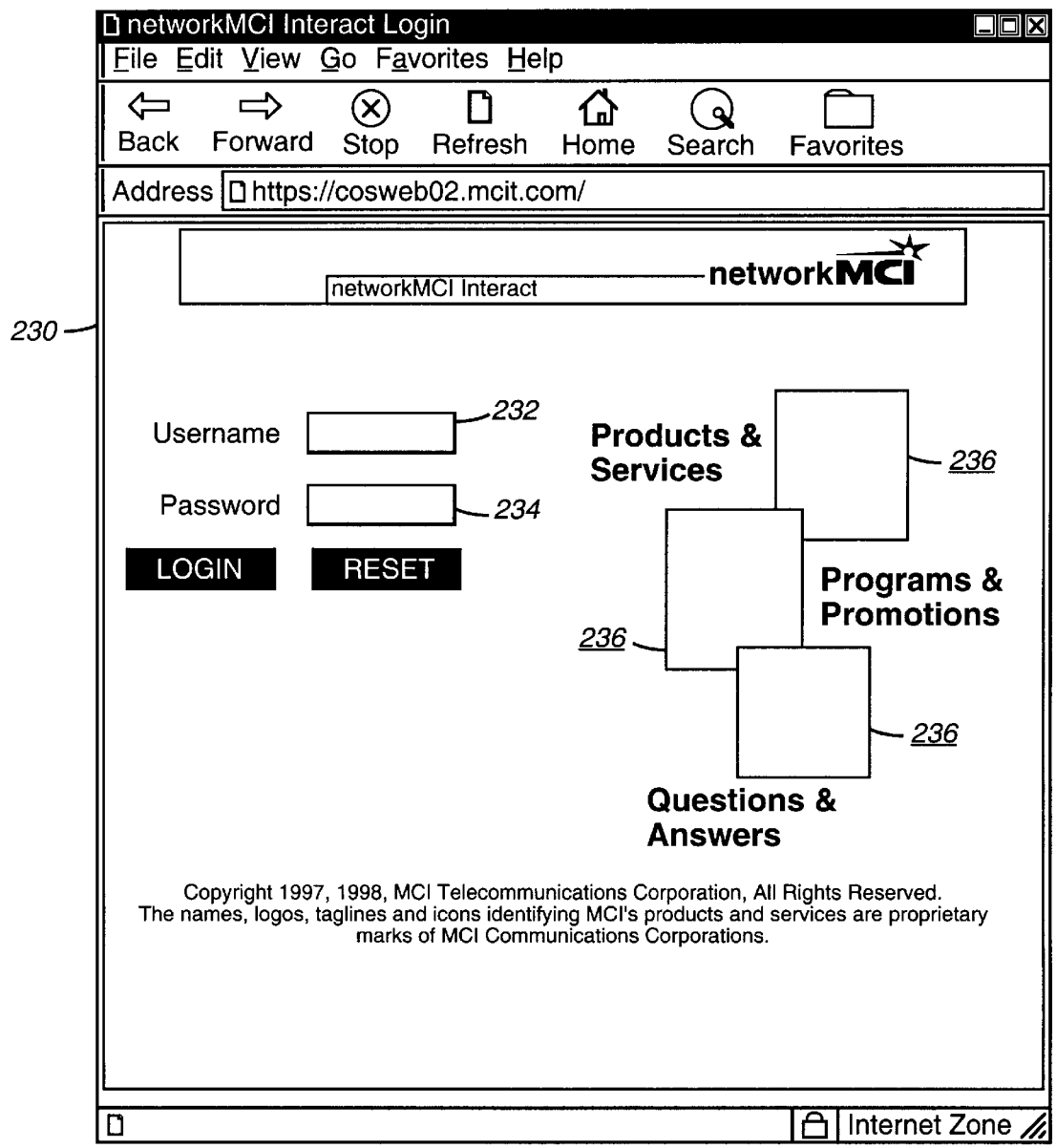
FIG. 6 is an example illustrating a logon Web page of the present invention.

FIG. 6 is an illustrative example of a logon Web page of the present invention. The logon page 230 typically includes name 232 and password 234 fields for user to enter. The logon page 230, in addition, may include hyper links 236 to other services such as product and service center, programs and promotions, and questions and answers concerning the system of the present invention. After the user is properly authenticated via the logon page 230, a home page is retrieved.

FIG. 4, as described previously, shows an example of a home page, typically a new Web page having the is backplane object. The home page 250 is downloaded after the authentication via the logon page. The home page 250 comprises icons 252a–h for each application services as well as an application tool bar 254 for invoking the services. The application tool bar 254 is different from the icons 252a–h in that the application tool bar 254 remains on a screen, even when the home page 250 is no longer displayed. The home page also typically comprises HTML links to other services 256a–c. These services may be new information center, features benefits, or support center for the system of the present invention.

Figure 7:
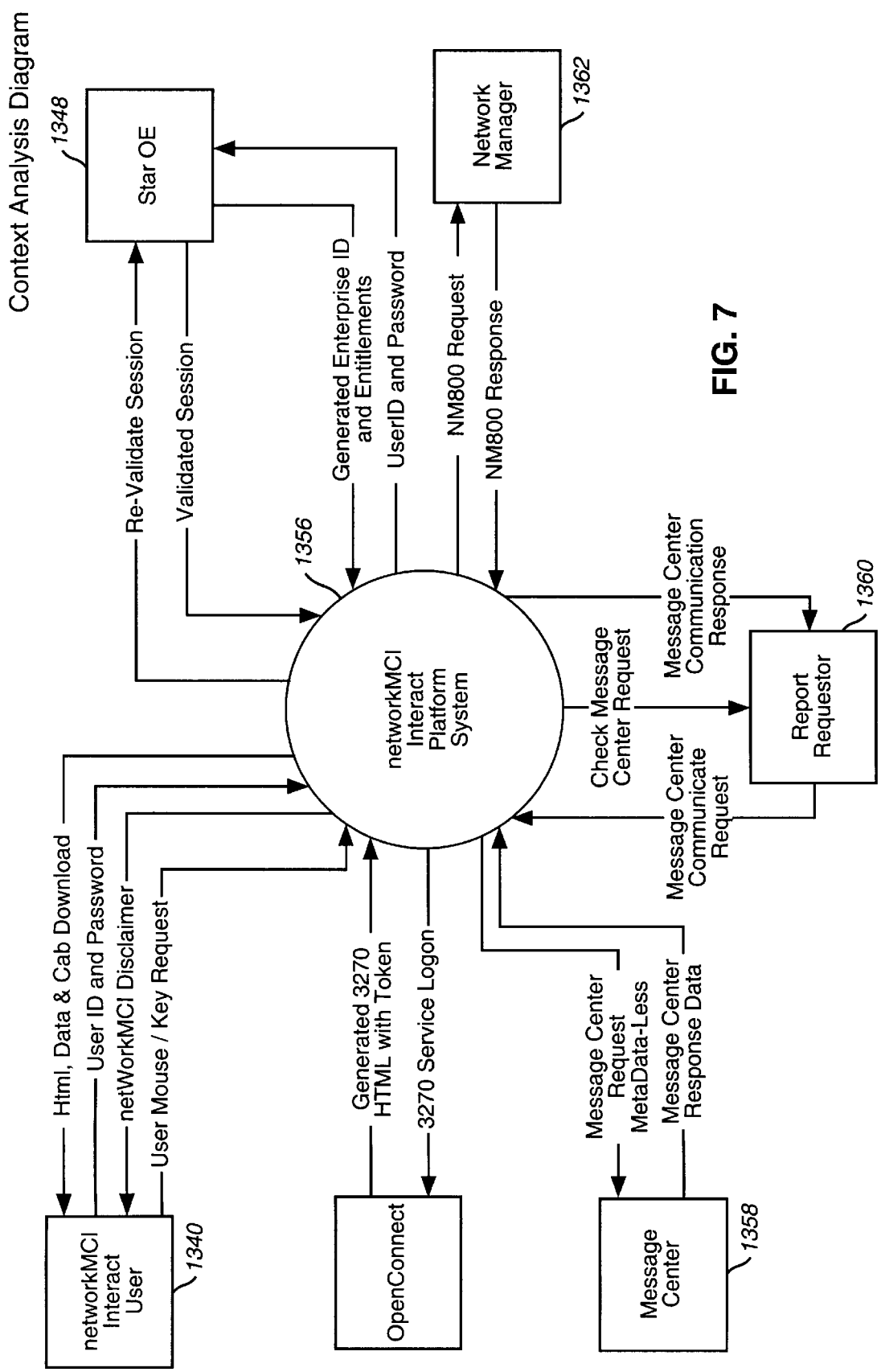
FIG. 7 is a context diagram illustrating it interactions with a user, a client platform, OE system and other application systems such as the inbox, report requester, and network manager.

FIG. 7 is a context diagram illustrating interactions with a customer, a client platform, the StarOE, the Order Entry System, and other Intranet application services such as the inbox, report requester, and network manager for communicating various transaction requests and responses. Typically, all customer interactions take place via a user interface program residing in the client platform 1356. The client platform 1356, in turn, communicates with appropriate Intranet application services, for example the inbox 1358, report requestor 1360, and network manager 1362, to process the customer's requests. The transactions communicated between the client platform 1356 and the customer 1340 include HTML page and cab file downloads 1402 according to customer directed URL, userid and password 1404 and mouse and keyboard requests 1408 acknowledgment of product disclaimers 1406 as entered by the customer at the client terminal.

In order to complete and process the transactions in response to a customer request, the client platform 1356 communicates with the desired application services for information. For example, with the StarOE, the client platform requests validation of sessions by communicating the customer's userid and password for authentication 1412. The StarOE validates the user by checking the userid/password pair stored in the customer profile and if valid, generates a message transaction response including the customer's enterprise id and entitlement. The StarOE then transmits the validated session response 1414 with the customer enterprise id and entitlements 1416. If the userid/password is not valid, the StarOE notifies the client platform, in which case the client platform may request second validation with a newly entered userid/password pair to the StarOE by transmitting a re-validate session request 1418. The client platform may also request from the StarOE various entitlement information associated with the customer, including application access entitlements or privileges the customer has in regard to the integrated suite of network applications.

FIG. 7 also shows transactions between the client platform 1356 and various Intranet application services including the network manager 1362, report requester 1360, and the inbox 1358. These transactions are specific to the functionality for a given application service. For example, the client platform 1356 may send toll free network management requests 1420 such as "add/delete TFNM corp ids" message which will add or delete corp ids from the list of toll free network manager participant and enterprise level corp ids. The toll free network management responds by sending a response message 1422 such as a "add/delete TFNM corp ids" response indicating that the request message was received and will be processed. Similarly, from the report requester 1360, the platform 1356 may send a check message center request 1424, and message center communication response for checking types of reports available at the message center. The report requester 1360 also may send message center communication request 1428 to the platform 1356. Likewise, with inbox 1358, a message center related transactions such as meta-data requests 1430 and responses 1432 may be communicated.

Figure 8:
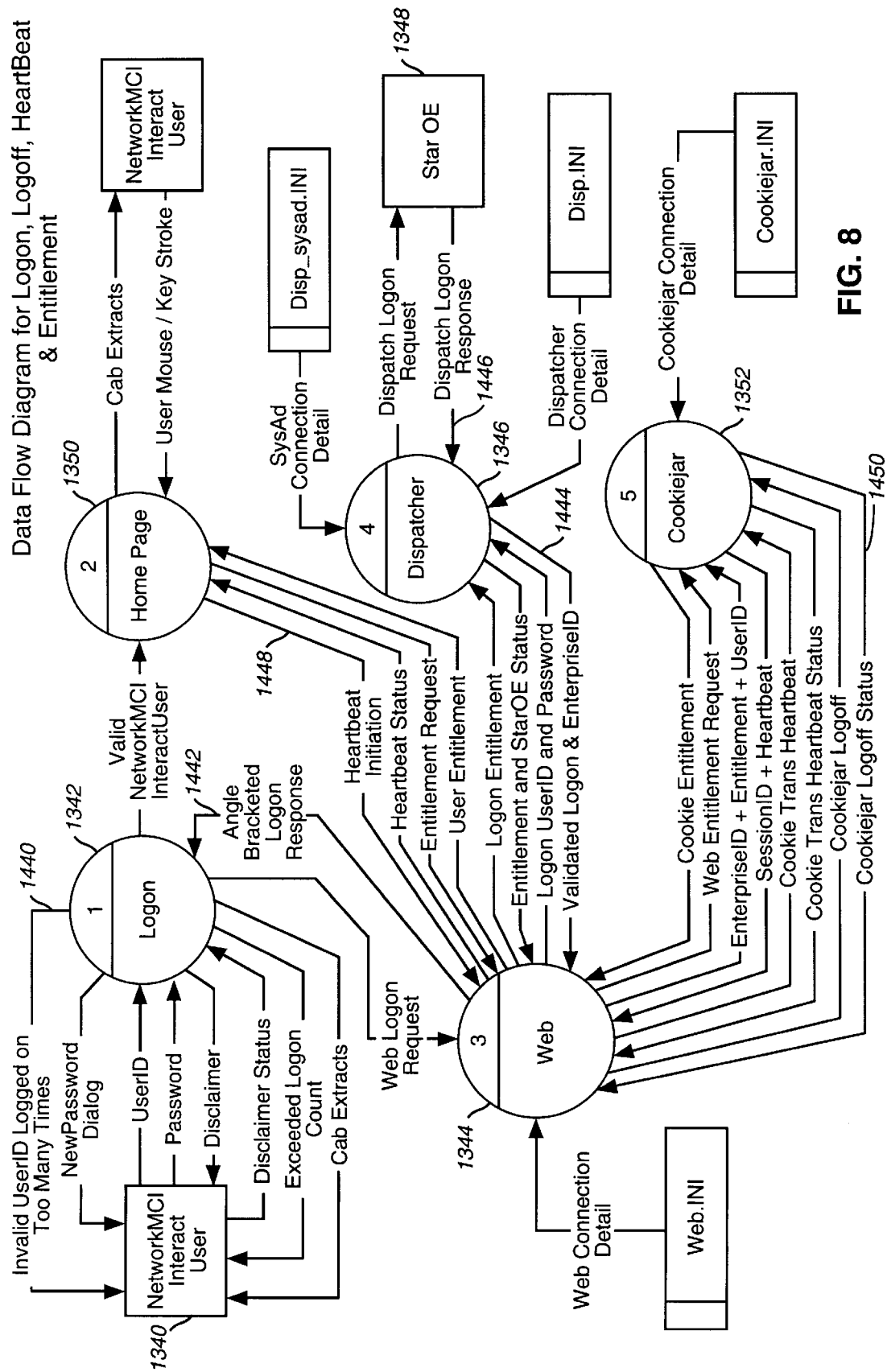
FIG. 8 is a data flow diagram illustrating the present invention's process flow during logon, entitlement request/response, heartbeat transmissions and logoff procedures.

As described above, StarOE is an authentication and entitlement system handling the "networkMCI Interact" logon authentication and user entitlements for customer sessions. At the initiation of the customer sessions and also throughout the duration the sessions, all the application services communicate with the StarOE for customer authentication and entitlements. The communication is performed typically by messaging interface, i.e., by transmitting data wrapped with appropriate message headers and trailers. FIG. 8 is a data flow diagram illustrating data flow among the processing modules of the "network MCI Interact" during logon, entitlement request/response, heartbeat transmissions and logoff procedures. As shown in FIG. 8, the client platform includes the networkMCI Interact user 1340 representing a customer, a logon Web page having a logon object for logon processing 1342, a home page having the backplane object. The Web server 1344, the dispatcher 1346, cookiejar server 1352, and StarOE server 1348 are typically located at the enterprise site.

A session may be initiated when a customer 1340 retrieves a logon Web page by pointing a Web browser to the "networkMCI Interact" Uniform Resource Locator (URL). Typically, cab files, class files and disclaimer requests are downloaded with the logon Web page as shown at 1440. At the logon Web page, the customer 1340 then enters a userid and password for user authentication as illustrated at 1440. The customer also enters disclaimer acknowledgment 1440 on the logon page 1342. If the entered userid and password are not valid or if there were too many unsuccessful logon transactions, the logon object 1342 communicates the appropriate message to the customer 1340 as shown at 1440. A logon object 1342, typically an applet launched in the logon Web page connects to the Web server 1344, for communicating a logon request to the system as shown at 1442. The logon data, having an encrypted userid and password, is sent to the dispatcher 1346 when the connection is established as shown at 1444. The dispatcher 1346 then decrypts the logon data and sends the data to the StarOE 1348 after establishing a connection as shown at 1446. The StarOE 1348 validates the userid and password and sends the results back to the dispatcher 1346 as illustrated at 1446 together with the user application entitlements. The dispatcher 1346 passes the data results obtained from the StarOE 1348 to the Web server 1344 as shown at 1444, which passes the data back to the logon object 1342 as shown at 1442. The customer 1340 is then notified of the logon results as shown as 1440.

When the customer 1340 is validated properly, the customer is presented with another Web page, referred to as the home page 1350, from which the backplane is launched typically. After the user validation, the backplane generally manages the entire user session until the user logs off the "networkMCI Interact". As shown at 1448, the backplane initiates a session heartbeat which is used to detect and keep the communications alive between the client platform and the enterprise Intranet site. The backplane also instantiates a COUser object for housekeeping of all client information as received from the StarOE 1348. For example, to determine which applications a current customer is entitled to access and to activate only those application options on the home page for enabling the customer to select, the backplane sends a "get application list" message via the Web server 1344 and the dispatcher 1346 to the StarOE 1348 as shown at 1448, 1444, and 1446. The entitlement list for the customer is then sent from the StarOE 1348 back to the dispatcher 1346, to the Web server 1344 and to the backplane at the home page 1350 via the path shown at 1446, 1444, and 1448. The application entitlements for the customer are kept in the COUser object for appropriate use by the backplane and for subsequent retrieval by the client applications.

Additionally, the entitlement information is also stored in the cookiejar 1352. When the Web server receives the entitlement requests from the backplane at the home page 1350 or from any other client applications, the Web server 1344 makes a connection to the cookiejar 1352 and checks if the requested information is included in the cookiejar 1352 as shown at 1450. The cookiejar 1352 is a repository for various customer sessions and each session details are included in a cookie including the entitlement information from the OE server 1348. During the logon process described above, the OE server 1348 may include in its response, the entitlements for the validated customer. The dispatcher 1346 transfers the entitlement data to the Web server 1344, which translates it into a binary format. The Web server 1344 then transmits the binary entitlement data to the cookiejar 1352 for storage and retrieval for the duration of a session. Accordingly, if the requested information can be located in the cookiejar 1352, no further request to the StarOE 1348 may be made. This mechanism cuts down on the response time in processing the request. Although the same information, for example, customer application entitlements or entitlements for corp ids, may be stored in the COUser object and maintained at the client platform as described above, a second check is usually made with the cookiejar 1352 via the Web server 1344 in order to insure against a corrupted or tampered COUser object's information. Thus, entitlements are typically checked in two places: the client platform 1350 via COUser object and the Web server 1344 via the cookiejar 1352.

When a connection is established with the cookiejar 1352, the Web server 1344 makes a request for the entitlements for a given session as shown at 1450. The cookiejar 1352 goes through its stored list of cookies, identifies the cookie for the session and returns the cookie to the Web server 1344 also shown at 1450. The Web server 1344 typically converts the entitlements which are received in binary format, to string representation of entitlements, and sends the entitlement string back to the backplane running on the client platform 1350.

Furthermore, the cookiejar 1352 is used to manage heartbeat transactions. Heartbeat transactions, as described above, are used to determine session continuity and to identify those processes which have died abnormally as a result of a process failure, system crash or a communications failure, for example. During a customer session initialization, the cookiejar 1352 generates a session id and sets up "heartbeat" transactions for the customer's session. Subsequently, a heartbeat request is typically sent from a process running on a client platform to the Web server 1344, when a connection is established, as shown at 1448. The Web server 1344 connects to the cookiejar 1352 and requests heartbeat update for a given session. The cookiejar 1352 searches its stored list of cookies, identifies the cookie for the session and updates the heartbeat time. The cookiejar 1352 then sends the Web server 1344 the updated status heartbeat as shown at 1450. The Web server 1344 then sends the status back to the client platform process, also as shown at 1450.

When a customer wants to logoff, a logoff request transaction may be sent to the Web server 1344. The Web server 1344 then connects to the cookiejar 1352 and requests logoff for the session as shown at 1450. The cookiejar 1352 identifies the cookie for the session and deletes the cookie. After deleting the cookie, the cookiejar 1352 sends a logoff status to the Web server 1344, which returns the status to the client platform.

Figure 9:
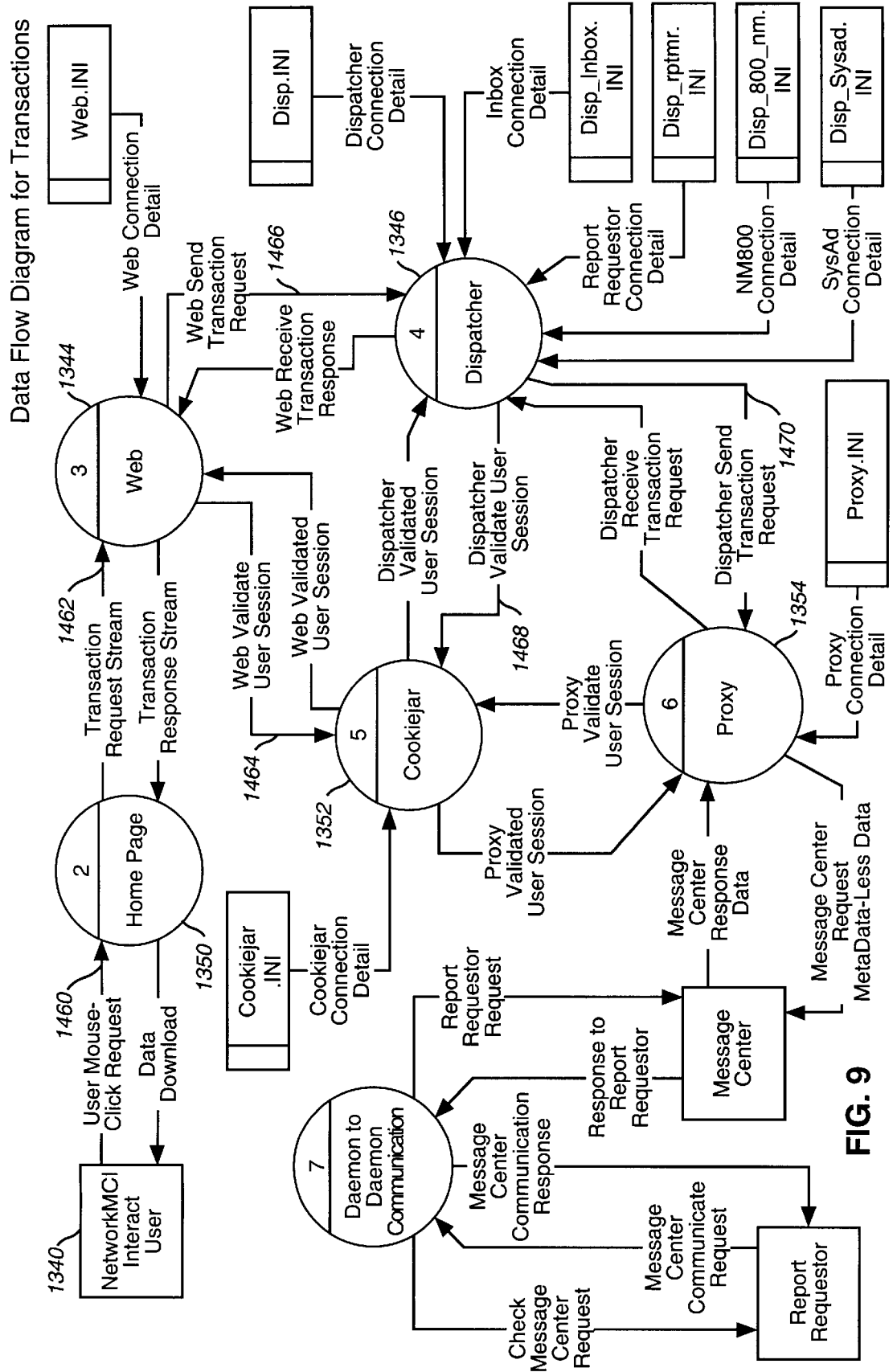
FIG. 9 is a data flow diagram for various transactions communicated in the system of the present invention.

Other transaction requests are also sent via the Web server 1344 and the cookiejar 1352 as shown in FIG. 9. FIG. 9 is a data flow diagram for various transactions communicated in the system of the present invention. Typically, when a customer enters a mouse click on an application link as shown at 1460, an appropriate transaction request stream is sent to the Web server as shown at 1462. The Web server 1344 typically decrypts the transaction stream and connects to the cookiejar 1352 to check if a given session is still valid as shown at 1464. The cookiejar 1352 identifies the cookie for the session and sends it back to the Web server 1344 as shown at 1464. The Web server 1344 on receipt of valid session connects to the dispatcher 1346 and sends the transaction request as shown at 1466. When the dispatcher 1346 obtains the request, it may also connect to the cookiejar 1352 to validate the session as shown at 1468. The cookiejar 1352 identifies the cookie for the session and sends it back to the dispatcher 1346 as shown at 1468. The dispatcher 1346, upon receiving the valid session connects to a targeted application server or proxy 354, which may include StarOE, and sends the request transaction to the target as shown at 1470. The server or proxy 354 processes the request and sends back the response as stream of data which is piped back to the dispatcher 1346 as shown at 1470. The dispatcher 1346 pipes the data back to the Web server 1344 as shown at 1466, which encrypts and pipes the data to the client platform as shown at 1462, referred to as the home page 1350 in FIG. 9.

User Logon

Figure 10:
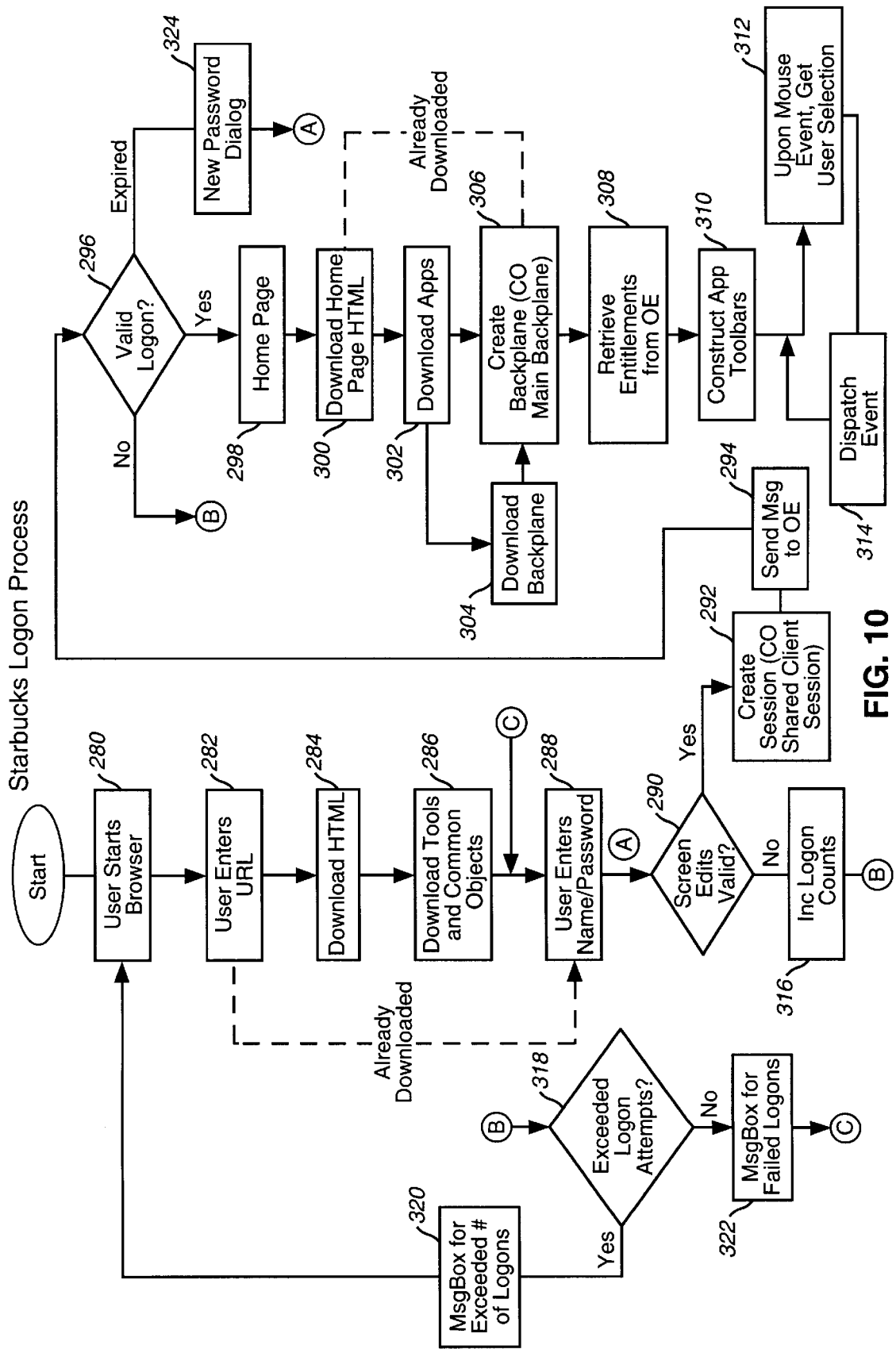
FIG. 10 is a flow diagram illustrating a logon process to the system of the present invention.

FIG. 10 is a flow diagram illustrating a logon process to the system of the present invention. Typically, a user starts a browser in step 280 and accesses a Web page having a logon applet by entering the URL in step 282 of the server servicing the system of the present invention. The HTML file associated with the Web page is downloaded with software tools and common objects in steps 284, 286. The user is then prompted to enter name and password on the Web page. If the system of the present invention determines that the software files including classes for initiating a session, have been already downloaded, for example, from a previous session, the steps 282, 284, 286 are skipped.

The logon applet checks for the name/password entry and instantiates a session object in step 292, communicating the name/password pair. The session object sends a message containing the name/password to a remote server for user validation in step 294. When the user is properly authenticated by the server in step 296, another Web page having backplane object is downloaded in steps 298, 300, 304. This page is referred to as a home page. At the same time, all the application software objects are downloaded in step 302. If the system of the present invention determines that the backplane and application files have been already downloaded, the steps 300, 302, 304 are not performed. The backplane object is then instantiated in step 306.

The backplane communicates with a remote server to retrieve the user's entitlements in step 308. The entitlements represent specific services the user has subscribed and has privilege to access. It also describes what entitlements the user may have within any single service. For example, from the COUser context, the backplane can obtain the list of applications that the user is entitled to access. In addition, each COApp holds set of entitlements within that application in COAppEntitlements object.

Using the information from the COUser context, the backplane knows which COApps to provide, e.g., which buttons to install in its toolbar. The backplane stores the user specific entitlements in memory for other processes to access. After determining the entitlements, the backplane initiates a new thread and starts an application toolbar in step 310. The application toolbar includes the remote services to which the user has subscribed and may select to run. From the application toolbar, a user is able to select a service to run. Upon user selection, the selection is communicated from the application toolbar to the backplane in steps 312, 314, which then launches the graphical user interface program associated with the selected service. The application toolbar remains on the user display, even after a particular service has been initiated. This is useful when a user desires to start up another remote service directly from having run a previous service because the user then need not retrieve the home page again.

If it is determined that the user entered password is not valid in step 290 or step 296, an attempted logon count is incremented in step 316. If the user's attempted logon count is greater than a predefined allowed number of tries as indicated in step 318, a message is conveyed to the user in step 320 and the user must restart the browser. If the user's attempted logon count is not greater than the predefined allowed number of tries, a "failed login" message is conveyed to the user in step 322, and the user is prompted to reenter name/password in step 288. If it is determined that the user password has expired, the user is prompted to change the password in step 324. For example, the user may be required to change the password every 30 days for security reasons. Whenever the user changes the password, the new password is transmitted in real time to a server responsible for updating and keeping the password entry for the user. The user than enters the new password in step 324 and continues with the processing described above in step 290.

Backplane Logic

Figure 11:
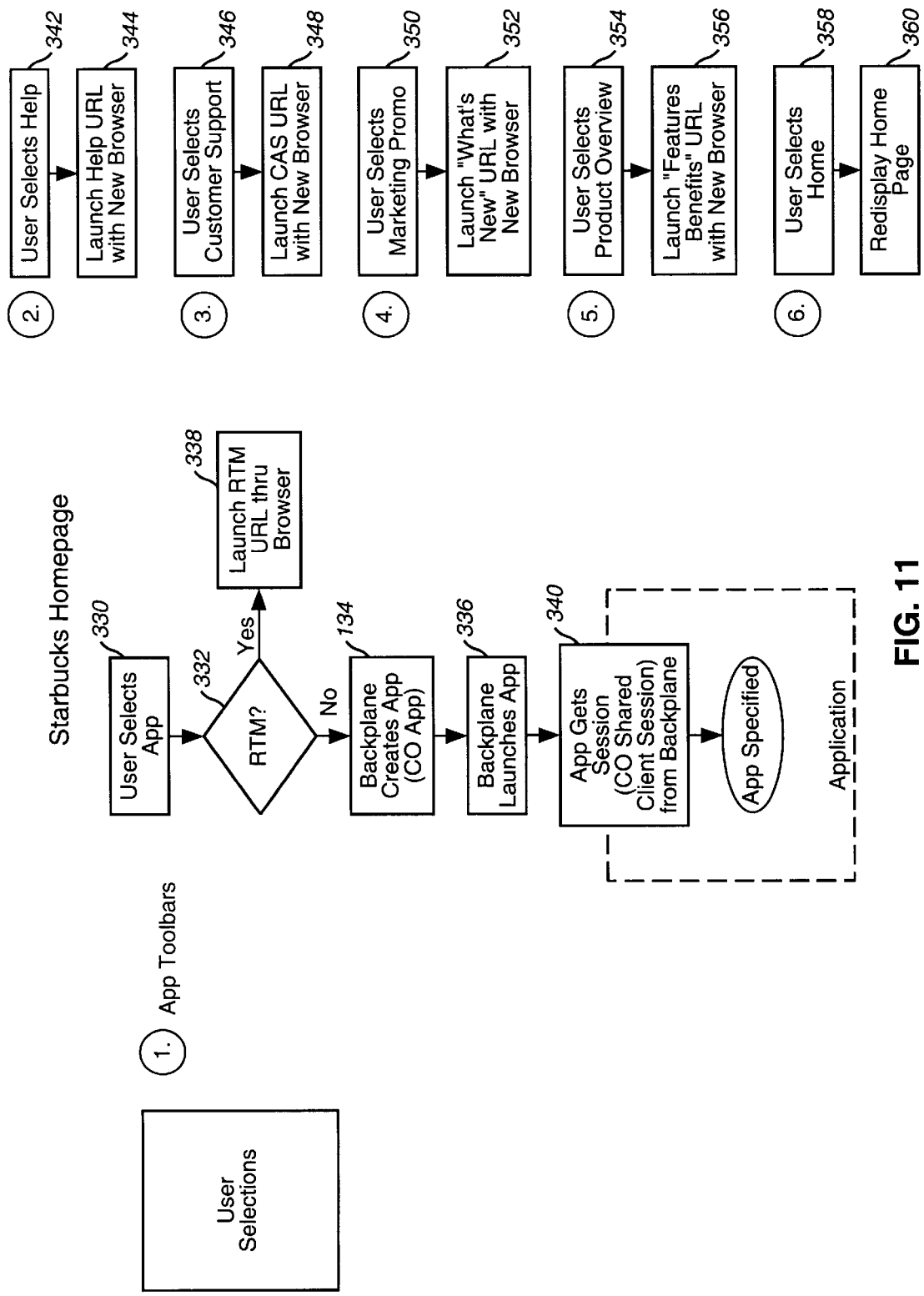
FIG. 11 is a flow diagram illustrating the backplane logic process when a user selects a service.

FIG. 11 is a flow diagram illustrating the backplane logic process when a user selects a service from a home page or the application toolbar. The user initially selects an application in step 330. If the selected application is derived from COAppImpl, the COBackPlane object 52 instantiates the desired application object by name. The COBackPlane 52 also creates a COAppStartThread object to manage the startup of the COAppImpl in step 336. Each COAppImpl is started in it's own thread. COAppStartThread calls the COAppImpl's init( ) method. Here the COAppImpl typically creates the application-specific classes it needs, including a COAppFrame (or a derived class thereof) if desired. COAppStartThread calls the COApp's start( ) method. Once the start( ) method has completed, the COAppStartThread ends.

If the desired application is derived from java.applet.Applet, a new browser window is created, and directed to the HTML page from which the applet to be loaded 338. This will cause the browser to load the applet, and call its init( ) and start( ) method. In its init( ) method, the applet obtains a reference to the backplane by calling the static method of the COBackPlane class getBackPlane( ). Also in its init( ) method, the applet notifies the backplane that it has been launched by calling the backplane's registerApp( ) method. Alternatively, if the desired application is an application requiring a direct URL launch from the home page, for example RTM as shown at step 332, the desired application is invoked by retrieving a Web page having the application's URL as shown at step 338.

Each application gets a session identifier in step 340 upon its startup. The session login and management will be described in more detail in reference to communications classes. Should the applications wish to perform some further authentication, they are free to retrieve the COUser object, and perform whatever special authentication they need, without troubling the user to re-enter his/her username and password. During the processing of functions specific to each application, the applications are able to communicate with one another as well as with the backplane by getting a reference to the applications or the backplane and invoking the public interfaces or methods with the reference.

After a user is finished with interacting with COApp, the user requests the selected COApp to exit via a menu selection, clicking on a close box button on a window frame, or a keyboard command, for example. The COApp then requests exit from the COBackPlane. If the selected application is derived from COAppImpl, the COBackPlane creates a COAppStopThread to manage the exit of the COApp. As with startup, each COApp is stopped in its own thread. COAppStopThread calls COApp's stop( ) method. Typically a COApp would not override this method. It is called for consistency with the applet interface of the COApp class. An applet's stop( ) method is called by the Web browser when the Web browser leaves the page from which the applet was loaded, in order to allow the applet to, for instance, stop an animation. For consistency with this model, COApps may use this method to stop long-running threads. COAppStartThread calls COApp's destroy( ) method. Here the COApp typically performs resource cleanup routines, including stopping any threads, and calling the dispose( ) method for any COAppFrame objects.

If the selected application is derived from java.applet.Applet, the Web browser window containing the page from which the applet was launched is closed. This will cause the applet's stop( ) method to be called by Web browser. In its stop( ) method, the applet notifies the backplane that it has been stopped by calling the backplane's deregisterApp( ) method.

Then a user typically requests logoff via menu, close box, etc. When such a request is received the backplane sends Logoff transaction to the Web Server. The backplane closes toolbar and directs the Web browser to logon URL. Then the backplane exits.

FIG. 11 also includes links to other Web pages. For example, if help hypertext is selected in step 342 from the application toolbar, a help URL is launched in a new browser window in step 344. Similarly, if customer support hypertext is selected in step 346, a customer support URL is launched in a new browser window in step 348. If a user selects a marketing promotion hypertext in step 350, URL for new product information will be launched in a new browser window in step 352. If a product overview hypertext is selected in step 354, a URL pertaining to the product's features will be launched in a new browser window in step 356. If a user selects home in step 358, the home page will be redisplayed in step 360.

User

The present invention includes a user unit for representing a user of a current session. The user unit is generally implemented as a COUser class extending java.lang.Object. The COUser class object typically holds information including a user profile, applications and their entitlements. In order to minimize network traffic, the amount of data carried by the COUser is minimal initially, and get populated as requests are processed. The requests are generally processed by retrieving information from the Order Entry service. The profile information is then stored and populated in the COUser object should such information be requested again.

A COUser object is created when the user logs in, and holds the username and password of the user as an object in the COClientSession object. The session object is contained within the backplane, which manages the session throughout its lifetime. The code below illustrates how this occurs:

// Within the backplane
COClientSession session=new COClientSession( );
try {
   Session.logon ("username", "password");
}catch (COClientLogonException e) { . . . };
// Should the User object be required
COUser user=session.getuser( );
The logon method of the COClientSession object communicates with the Order Entry server, a back-end authentication mechanism, for authenticating the user.

The COUser that may be obtained from the COClientSession immediately after the login process is very sparse. It includes a limited set of information such as username, a list of applications that user is entitled to, for example. The details of each entitlement information are retrieved at the time of actual processing with those information.

Communications

The present invention includes a client communications unit for providing a single interface from which the backplane and the applications may send messages and requests to back-end services. The client communications unit includes a client session unit and a transactions unit. The client session unit and the transactions unit comprise classes used by client applications to create objects that handle communications to the various application proxies and or servers. Generally, the entire communications processes start with the creation of a client session after a login process. This is started through the login process. The user logs into user's Web page with a username and password. During a login process, a client session object of class COClientSession is created, and the COClientSession object passes the username and password information pair obtained from the login process to a remote system administrative service which validates the pair. The following code instructions are implemented, for example, to start up a session using the COClientSession class.

COClientSession ss=new COClientSession( );
  try {
    ss.setURL(urlString);
    ss.logon("jsmith", "myPassword");
  } catch (COClientLogonExeception e) { . . .
  } catch (MalformedURLException e) { . . . };

In addition, the COClientSession object contains a reference to a valid COUser object associated with the user of the current COClientSession object.

The client session object also provides a session, where a customer logs on to the system at the start of the session, and if successfully authenticated, is authorized to use the system until the session ends. The client session object at the same time provides a capability to maintain session-specific information for the life/duration of the session. Generally, communications to and from the client takes place over HTTPS which uses the HTTP protocols over an SSL encrypted channel. Each HTTP request/reply is a separate TCP/IP connection, completely independent of all previous or future connections between the same server and client. Because HTTP is stateless, meaning that each connection consists of a single request from the client which is answered by a single reply by a server, a novel method is provided to associate a given HTTP request with the logical session to which it belongs.

When a user is authenticated at login via the system administrative server, the client session object is given a "cookie", a unique server-generated key which identifies a session. The session key is typically encapsulated in a class COWebCookie, "public COWebCookie (int value).", where value represents a given cookie's value. The client session object holds this key and returns it to the server as part of the subsequent HTTP request. The Web server maintains a "cookie jar" which is resident on the dispatch server and which maps these keys to the associated session. This form of session management also functions as an authentication of each HTTP request, adding security to the overall process. In the preferred embodiment, a single cookie typically suffices for the entire session. Alternatively, a new cookie may be generated on each transaction for added security.

Moreover, the cookie jar may be shared between the multiple physical servers in case of a failure of one server. This mechanism prevents sessions being dropped on a server failure.

In addition, to enable a server software to detect client sessions which have "died", e.g., the client session has been disconnected from the server without notice because of a client-side crash or network problem, the client application using the client session object "heartbeats" every predefined period, e.g., 1 minutes to the Web server to "renew" the session key (or record). The Web server in turn makes a heartbeat transaction request to the cookiejar. Upon receipt of the request, the cookiejar service "marks" the session record with a timestamp indicating the most recent time the client communicated to the server using the heartbeat. The cookiejar service also alarms itself, on a configurable period, to read through the cookiejar records (session keys) and check the timestamp (indicating the time at which the client was last heard) against the current time. If a session record's delta is greater than a predetermined amount of time, the cookiejar service clears the session record, effectively making a session key dead. Any subsequent transactions received with a dead session key, i.e., nonexistent in the cookiejar, are forbidden access to the Firewall.

The heartbeat messages are typically enabled by invoking the COClientSession object's method "public synchronized void enableSessionHeartbeat (boolean enableHeartbeat)", where enableHeartbeat is a flag to enable or disable heartbeat for a session. The heartbeat messages are typically transmitted periodically by first invoking the COClientSession object's method "public synchronized void setHeartbeatInterval (long millsecsInterval)", where the heartbeat interval is set in milliseconds, and by the COClientSession object's method "protected int startHeartbeat( )", where the heartbeat process starts as soon as the heartbeat interval is reached. Failure to "heartbeat" for consecutive predefined period, e.g., one hour, would result in the expiration of the session key.

As described previously, a typical communication with remote services are initiated by instantiating a COClientSession object. A COClientSession instance may then be used to connect to a given URL by invoking its methods setURL( ) and logon( ). There are no limitations on how many simultaneous connections are allowed.

During the logon process, the given URL would point to the home page containing the backplane applet.

A second component of the communications unit provided and used in the present invention is a transactions class. The main purpose of a transaction is to send a message to a back-end service and return the corresponding response from that service. This response may also be in a form of a message. Any message may be sent with any transaction. Transactions need not be aware of any service content type information. Instead, this information is encapsulated in the messages sent to and from the back-end service. The transaction classes provide a single transaction feel to the user of a transaction although the transaction instances may conduct multiple HTTP/HTTPs transactions to back-end services, thus hiding complexity from the user of a transaction.

Transaction classes include two main behaviors: blocking and non-blocking. Non-blocking transactions optionally have blocking type behavior. The present invention provides a synchronous blocking type transaction and asynchronous and bulk non-blocking type transactions.

The top most abstract base class of all of the transaction classes is the COTransaction class. Derived instances of this class gain their blocking behavior from it. Non-blocking behavior is inherited from the abstract class CONonblockingTransaction. Since this class inherits from COTransaction, all derived instances of CONonblockingTransaction have both blocking and non-blocking behavior. The synchronous type transaction class is COSynchTransaction while the asynchronous and bulk transaction classes are COAsynchTransaction and COBulkTransaction respectively. Being a blocking only type transaction, COSynchTransaction extends COTransaction. COAsynchTransaction and COBulkTransaction give both blocking and non-blocking behavior and therefore extend CONonblockingTransaction.

In order to send a message, two pieces of information need to be provided to the transaction: the first is the message to send to a back-end service and second is the target back-end service of interest, generally represented by a COService object.

Once a request has been executed or sent, a synchronous transaction will block until a response is received. Because there are occasions when the network may fail and the response lost, the maximum time to wait for a response may be set through the setMaxTime2Wait( ) function. A synchronous transaction object is an instance of COSynchTransaction.

The non-blocking type transactions provided by the present invention extend the CONonblockingTransaction base class. For sending a message in a non-blocking mode, the sendRequest( ) method is invoked. This method returns a boolean which indicates whether the request was successfully registered to be sent to the desired back-end service. After the response arrives, a pre-registered callback is sent to a co-registered object. Because the sendRequest( ) method is non-blocking, the control is returned to the caller of the method as the request is being sent. Since this mechanism is implemented using threads, the resulting callback method is invoked in a thread that is different from the thread which invoked the sendRequest( ) method.

An asynchronous transaction is either direct or derived instances of COAsynchTransaction. When used in the blocking mode (sendMessage( )), it appears like a synchronous transaction. The difference between a blocking asynchronous transaction and a synchronous transaction is that a blocking asynchronous transaction sends the initial request and then polls for the response. This kind of transaction allows the for sending a message to a service which cannot immediately satisfy the request. Instead this kind of service would register the request and inform (when polled) the client when the response was ready. However, this continual polling is transparent.

The present invention provides a bulk transaction type. Although this transaction action may be used to send any message, its use typically is for large data transfers. Large data sets are difficult to handle successfully in bulk thus they are often split into smaller data blocks. As the other transactions, the bulk transaction object handles the complexity behind the scenes. Like the asynchronous transaction object, a bulk transaction object used in a blocking mode looks like a synchronous transaction. Unlike the asynchronous and synchronous transactions it informs the calling process as intermittent data comes in. This granularity of data that is known as the block size is determined by the caller of the transaction. Both the bulk blocking and non-blocking modes are capable of notifying the caller when each block of data arrives at the client side from the back-end service.

Instances of COBulkTransaction are capable of executing bulk transactions. Like the asynchronous transaction class (COAsynchTransaction), COBulkTransaction blocking mode is invoked with the sendmessage( ) java message and its non-blocking mode is invoked with the sendRequest( ) Java message in the CoNonblockingTransaction class. In addition to sending a callback Java message to a registered object when the transaction is finished, COBulkTransaction instances send another callback message when each data block arrives. This second callback is sent in both blocking and non-blocking modes and is used to send large data sets synchronously. COBulkTransaction instances are capable of transferring only a portion of data from a back-end service. This portion can also start at any offset within the complete data set. This functionality will mainly be used by messages which understand how to transfer data to files.

Input/Output Services

In order to centralize and unify all input/output transactions performed by the backplane and the client applications, the present invention includes a set of common input/output services objects for use by the backplane and the applications. These include a framework for printing, data export and import, logging, configuration file management and statistics.

The common input/output services objects provide simplified and standardized export/import interface. Containers, which need to be exported, implement the "Exportable" interface. Here, "containers" is used in the broadest possible sense, spanning everything from a complete application to the smallest data container, e.g., trees, queues. This architecture defines exactly how a container will be converted from an object in active memory, to a data array in static memory. The Exportable interface suggests three possibly exportable data formats: a string, byte arrays, and character arrays.

The class "Export" contains a number of convenience methods for writing strings, byte arrays, or character arrays to a specified file. In the code example, the container "tree" implements the "Exportable" interface.

// First, get a reference to a file to export to File file=new File("/MyDirectory/treeExport");
// Then use the Export class to export . . .
Try {
  Export.exportData (file,
tree.getExportableByteArray( ) );
} catch (IOException ioe) { . . . }

Containers, which need to import data, implement the "Importable" interface. An application's import and export mechanisms need not be symmetrical. The interface mechanism defines exactly how import will occur, that is, how a given body of static data will be integrated into the running application. The interface expects to import data in one of three forms: strings, byte arrays, or character arrays.

The class "Import" provides convenience methods for reading strings, byte arrays, or character arrays from a specified file. The following code fragment represents use of data import. Here, "tree" is a data container, which implements the "Importable" interface.

// First, get a reference to a file from which to
// import . . .
File file=new File("/MyDirectory/treeImport");
// Then use the Import class to import . . .
byte[ ] data=Import.importByteData(file);
tree.importByteArray(data);

The input/output services objects also include a centralized logging utility. The purpose of logging is twofold: it allows developers to get a good handle on what functions customers are using, helping marketing, while also giving a way to checkpoint the series of actions, which led to a failure of the application.

The global logfile has global parameters, and also serves as a container for each of the application logfile objects. Each active application has a reference back to the application logfile in the global object. The following represents a code example of logfile use. In the following code, "myself" is the COUser object.

// In the application object . . .

COAppLog appLog=COAppLog.getAppLog(this);

applog.addEntry(COAppLog.INFO, "Key Event", "User pushed OK");

The input/output services objects also include configuration file object. A configuration file represents either a user's choice of desirable application characteristics or a set of default characteristics. The preferred structure for the configuration file is a hierarchy, which places the application at the highest level, then the version, followed by the section and then by a parameter name-value pair: application.version.section.name.

The general architecture of the configuration file object is just like that of the logfile object. The following represents an example of the code that would be generated by use of application configuration file object.

// In the application object . . . COAppConfiguration appConf=COAppConfiguration.getAppConfiguration (this);

String CDRomDriver=appConf.getEntry("Drivers", "CDROM");

The input/output services objects also include statistics objects for holding a number of counters and other numerical data, which allow the backplane and the applications to keep a numerical log. The type of object that a statistic object might hold are the number of times that a user exported data, or the number of times that an application communicated back to a specific back-end server. The architecture is identical to that of logging and configuration files. The following represents code example for use of statistics.

// In the application object . . . COAppStat appstat= COAppStat.getAppStat(this);

appStat.incrementValue("Communications2Server");

Security

The present invention allows the backplane and the client applications to utilize browser built-in security functions without having to be tied to a specific code. The present invention provides an additional module which wraps the security functionality of specific browsers available off-the-shelf.

Figure 12:
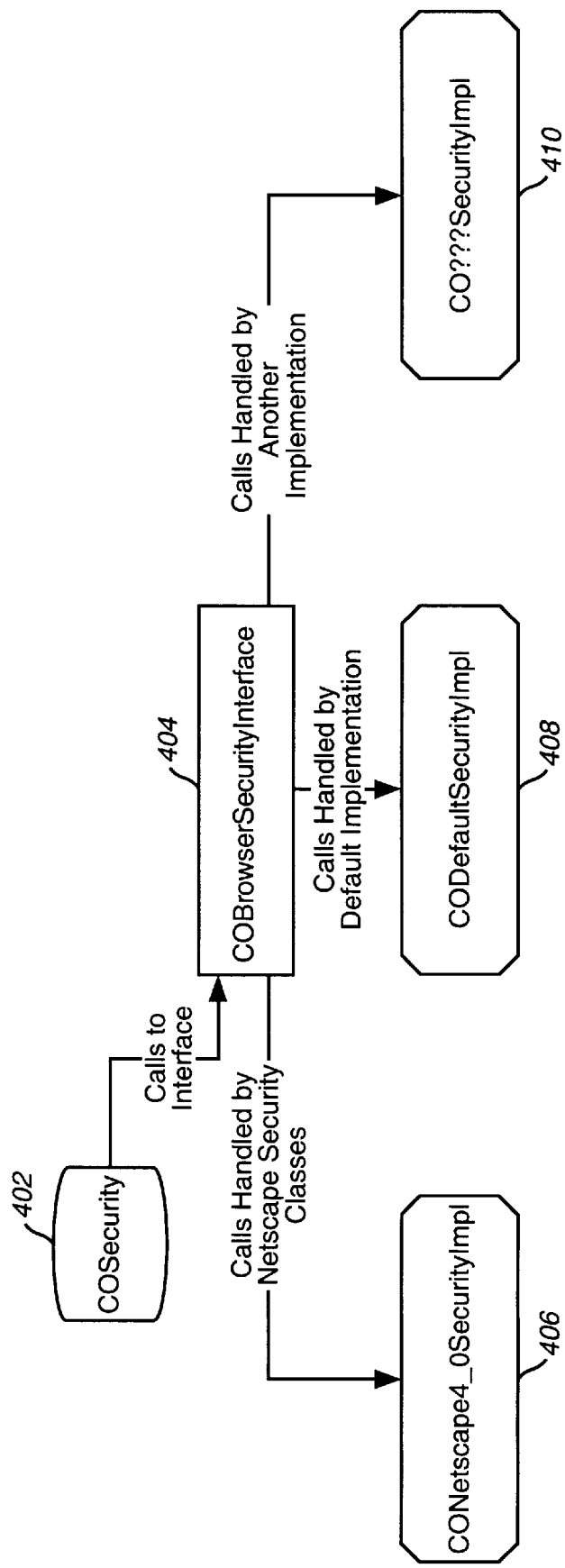
FIG. 12 is a diagram illustrating a security module design having clean separation from the browser specific implementations.

FIG. 12 is a diagram which illustrates a security module design having clean separation from the browser specific implementations. The security module comprises the main COSecurity class 402, and the interface COBrowserSecurityInterface 404. The COSecurity object checks browser type upon instantiation. It does so by requesting the "java.vendor" system property. If the browser is Netscape, for example, the class then instantiates by name the concrete implementation of the Netscape security interface, nmco.security.securityimpls.CONetscape4_0SecurityImpl 406. Otherwise, it instantiates nmco.security.securityimpls.CODefaultSecurityImpl 408. COSecurity 402 includes a number of methods for accessing local resources, e.g., printing, importing and exporting data, and getting/setting local system properties.

The COBrowserSecurityInterface 404 mirrors the methods provided by COSecurity 402. Concrete implementations such as CONetscape4_0SecurityImpl 406 for Netscape Communicator and CODefaultSecurityImpl 408 as a default are also provided. Adding a new implementation 410 is as easy as implementing the COBrowserSecurityInterface, and adding in a new hook in COSecurity.

After using "java.vendor" to discover what browser is being used, COSecurity 402 instantiates by name the appropriate concrete implementation. This is done by class loading first, then using Class.newInstance( ) to create a new instance. The newinstance( ) method returns a generic object; in order to use it, it must be cast to the appropriate class. COSecurity 402 casts the instantiated object to COBrowserSecruityInterface 404, rather than to the concrete implementation. COSecurity 402 then makes calls to the COBrowserSecurityInterface "object," which is actually a concrete implementation "in disguise." This is an example of the use of object oriented polymorphism. This design cleanly separates the specific implementations which are browser-specific from the browser-independent COSecurity object.

Each COApp object may either create their own COSecurity object using the public constructors, or retrieve the COSecurity object used by the backplane via COBackPlane.getSecurity( ). In general, the developer of the applications to be run will use the COSecurity object whenever the COApp needs privileged access to any local resource, i.e., access to the local disk, printing, local system properties, and starting external processes. The following represents an example of the code generated when using the security object.

// Instantiating COSecurity objectCOSecurity security= new COSecurity( );
// Now access a privileged resource
try {
   String s=security.getSystemProperty("user.home");
   System.out.println(s);
}
catch(COSecurityException cose)
{
   // take care in case of security exception
}

Help

In order for the backplane and the client application to integrate help functionality of a underlying browser, the present invention provides a help framework. There are two semi-independent parts to providing help. The first part is the help itself which is handled through the COHelp object. The second part is the help "infrastructure" which is provided by the COHelpListener interface. They are semi-independent because one may be safely used without the other although they are meant to complement each other.

The COHelp object provides a calling interface with which the underlying browser can bring up the help information. To bring up help using this object, all that is necessary is to pass a URL pointing to the relevant help page and a reference to the COApp. For example:

if (action==HELP) {
   try {
     // creating the help URL
     URL helpURL=new URL("index.html");

```
    // calling help
    COHelp.showHelp(thisCOApp, helpURL);
} catch (MalformedURLException e)
{ /* do something */ }
}
```

The COHelpListener interface provides a set of convenient functions for implementing help in COApps. This interface provides functions to define a default help URL:

```
void setHelpURL(URL help);
URL getHelpURL( );
```

The COHelpListener interface also provides the initial foundation for handling F1 help calls. It extends the KeyListener interface which is needed to detect F1 keystrokes.

Handling Large Datasets—Cache Management

For management of large data sets by the backplane and the client applications, the present invention provides a two-tier (disk/memory) caching mechanism. The caching mechanism may be useful, for example, when given the constraints placed upon the size of the runtime code in the browser context. The caching module is composed of two different caches to address differing needs: a byte-based cache, i.e., CoByteBasedDataCache, and a line-based cache, i.e., COLineBasedDataCache. The line-based cache is useful for cases where the data is naturally divided into rows, e.g., database tables. The byte-based cache is more free-form for specialized uses. Both caches have the same underlying behavior.

The cache has several properties, such as how much data to keep in active memory: either the number of byte-based pages or the number of rows. It is also given a reference to a remote data source and a local file. Finally, the size of a each page is variable: either the number of bytes per page or the number of rows per page.

Upon instantiation, the cache immediately begins downloading information from the remote data source and writing it to the local file, while simultaneously calculating page boundaries for the local file, maintaining the vector of page boundaries in active memory. A page boundary is the file location in bytes of the beginning of a new page.

When a request is made to the cache for a page (or a row), the result (along with a variable number of pages [or rows] preceding and following the requested page) is cached in active memory. Specifically, when a request is made to the cache, if the page can be returned immediately from active memory, it does so. Otherwise, the cache attempts to retrieve the page from the disk (along with pages following and preceding), storing the results in the cache's active memory. Finally, if the requested page has not yet been downloaded from the remote data source, the method blocks.

The cache is useful in cases where the size of a downloaded dataset may stretch or exceed the capabilities of the Java runtime; the runtime in browsers is especially limited. It is also useful in cases where high-speed access to large datasets is necessary. Here, the assumption is that accessing the disk where the dataset is stored will be much faster than a network transaction. An example situation is the downloading and caching of thousands of rows from a database located on the public Internet behind firewalls and proxies.

Error Handling

For catching errors occurring during the backplane and the client application processing, the present invention provides a single centralized base exception, COException. All the exceptions specific to the COApps are derived from this base exception.

As previously described, the system of the present invention utilizes a set of common objects for implementing the various functions provided by the system of the present invention.

While the invention has been particularly shown and described with respect to preferred embodiments thereof, it will be understood by those skilled in the art that the foregoing and other changes in form and details may be made therein without departing from the spirit and scope of the invention.

Having thus described our invention, what we claim as new, and desire to secure by Letters Patent is:

1. A system for integrating and managing one or more client application programs which enable a user to interact with one or more web enabled services subscribed by the user, comprising:

a web browser, resident on a client platform, the web browser capable of receiving one or more web pages from a remote server;

a backplane object downloaded with, and launched by the web page, the backplane object capable of launching the client application programs upon initiation by the user, the backplane object further enabling inter-application communications among the client application programs and also with the backplane object, whereby the backplane object and the client application programs intproperate with one another to provide an integrated customer interface to a plurality of communications network management services subscribed by the user.

2. The system as claimed in claim 1, wherein the system further comprises:

a logon object downloaded with and launched by the web page, the logon object capable of accepting logon transactions from the user; and a session object created by the logon object, the session object communicating with the remote server to provide user authentication, whereby upon successful user validation from the remote server, the logon object sends a command to the remote server to download the client application programs and the web page having the backplane object.

3. The system as claimed in claim 2, wherein the system further comprises a user object for a representing a current user, the user object further communicating with the remote server to determine the user's entitlements to the web enabled services, whereby the backplane uses the entitlements to present to the user only those web enabled services to which the user has privilege.

4. The system as claimed in claim 3, wherein the client application program is run directly by the backplane when the user selects the service associated with the client application program, whereby the client application program runs in a frame independent from the web browser's window.

5. The system as claimed in claim 3, wherein the client application program is a program launched from a new browser window created by the backplane.

6. The system as claimed in claim 3, wherein the backplane object maintains session information received from the remote server in static memory for the duration of a session, and enables the client application programs to access the static memory, whereby a need for each of the client application programs to communicate with remote servers for once obtained information is eliminated.

7. The system as claimed in claim 3, wherein the client application program includes an application toolbar for presenting the web enabled services to the user, the application toolbar having a capability to launch, upon the user's initiation, the client application programs associated with the web enabled services, the application toolbar further having a capability to remain static on the screen foreground, whereby the user may select a second web enabled service after having run a first web enabled service without having to re-retrieve the web page having the backplane object.

8. The system as claimed in claim 3, wherein the system further comprises a graphical user interface unit for enabling the client application programs and the backplane to provide common look-and-feel desktop window management features.

9. The system as claimed in claim 3, wherein the system further comprises a communication transaction unit for enabling the backplane and the client application programs to communicate with the server, whereby the communication transaction unit may track messages communicated.

10. The system as claimed in claim 3, wherein the system further comprises a security unit for providing a browser-independent interface for accessing browser-specific security implementations.

11. The system as claimed in claim 3, wherein the system further comprises an error handling unit for managing exceptions occurring in the client application programs and the backplane.

12. The system as claimed in claim 3, wherein the system further comprises an input/output services unit for providing input/output services including printing, logging, data exporting and importing, managing default configuration files and statistics, whereby the backplane and the client application programs use the input/output services unit for their input/output needs thereby containing all input/output functions in the input/output services unit.

13. The system as claimed in claim 3, wherein the system further comprises a cache unit for establishing a two-tier disk-memory caching mechanism whereby upon instantiation of a cache object, the cache object retrieves a requested page from a local disk along with pages following and preceding it into the cache object's active memory if the requested page is available in the local disk and, if the requested page is not available in the local disk, the cache object downloads information including pages following and preceding it from a remote data source and writes the information to the local disk, storing the information into the cache object's active memory.

14. The system as claimed in claim 3, wherein the system further comprises a web help unit for enabling the backplane and the client applications to command the web browser to bring up help information by passing a URL pointing to a help page and a reference to the client application or the backplane.

15. The system as claimed in claim 3, wherein the system further comprises a heartbeat message unit for enabling the client applications to notify the server periodically of their status, whereby when the server does not receive notification for a predefined period, the client application is denoted as having exited.

16. The system as claimed in claim 3, wherein the web pages further comprise hyper links to other web pages and services.

17. The system as claimed in claim 3, wherein the user object stores in its memory the user's entitlements after retrieving them from the remote server.

18. A method for integrating and managing one or more client application programs for enabling a user to interact with one or more web enabled services to which the user has subscribed, the method comprising:

receiving a web page having a backplane object from a remote server;

downloading a client application program associated with the web enabled services;

launching the backplane object;

presenting to the user the client application programs associated with the web enabled services to which the user has subscribed and which the user may select; and creating the client application program upon the user's request, whereby the backplane object and the client application programs interoperate with one another and communicate with the remote server to provide an integrated customer interface to a plurality of communications network management services subscribed by the user.

19. The method according to claim 18, wherein the method further comprises:

accepting a user logon transaction from the user; and authenticating the user logon transaction by communicating with the remote server, before the step of receiving a web page having a backplane object from a remote server.

20. The method according to claim 19, wherein the step of presenting further comprises:

determining entitlements for services to which the user has privilege; and enabling only those services to which the user is entitled.

21. The method according to claim 20, wherein the step of creating comprises launching the client application program directly from the backplane object.

22. The method according to claim 20, wherein the step of creating comprises:

downloading a new browser window; and launching the client application program from the new browser window.

23. The method according to claim 20, wherein the method further comprises:

maintaining information data in a static memory throughout a session.

24. The method according to claim 20, wherein the method further comprises:

launching an application toolbar for presenting the web enabled services to the user;

displaying the application toolbar on the screen foreground.

25. The method according to claim 20, wherein the method further comprises sending a heartbeat message to the server periodically for keeping communications alive with the server.

26. The method according to claim 20, wherein the method further comprises generating one or more session keys for identifying a session when communicating with the web enabled services.

27. The method according to claim 20, wherein the method further comprises passing a URL pointing to a help page and a reference to the client application or the backplane, whereby the web browser brings up help information.

28. The method according to claim 20, wherein the method further comprises hyperlinking to other web pages and services.

29. A system for creating integrated client applications for enabling a user to interact with one or more web enabled services to which the user has subscribed, the system comprising:

an application backplane class for managing a plurality of client application programs;

an application interface class for implementing the client application program associated with the web enabled service, the application interface class further including a messaging device for enabling communications among the plurality of client application programs;

GUI class extensions for enabling the client application programs to provide common look-and-feel desktop window management features; and a client communications interface for providing a single interface from which the client application programs may send messages and requests to one or more back-end services, whereby a shared library of common objects is provided as a framework in which a family of Internet applications can be created and managed from an integrated system.

\* \* \* \* \*